(12) United States Patent
Ikeda et al.

(10) Patent No.: US 7,987,513 B2
(45) Date of Patent: Jul. 26, 2011

(54) DATA-USE RESTRICTING METHOD AND COMPUTER PRODUCT

(75) Inventors: Keiichi Ikeda, Kawasaki (JP); Seigo Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1014 days.

(21) Appl. No.: 11/492,013

(22) Filed: Jul. 24, 2006

(65) Prior Publication Data

US 2007/0150961 A1 Jun. 28, 2007

(30) Foreign Application Priority Data

Dec. 26, 2005 (JP) ................................. 2005-373331

(51) Int. Cl.
*H04L 29/00* (2006.01)

(52) U.S. Cl. ................ 726/27; 726/26; 726/28; 726/29; 726/30

(58) Field of Classification Search ................ 726/26–30
See application file for complete search history.

(56) References Cited

U.S. PATENT DOCUMENTS

| 7,689,563 | B1 * | 3/2010 | Jacobson | ...................... 707/663 |
| 2002/0046236 | A1 * | 4/2002 | Morimoto et al. | ............. 709/203 |
| 2002/0194506 | A1 * | 12/2002 | Wiley et al. | .................... 713/201 |
| 2003/0084294 | A1 * | 5/2003 | Aoshima et al. | .............. 713/169 |
| 2004/0139316 | A1 | 7/2004 | Kotani | |
| 2005/0240740 | A1 * | 10/2005 | Takeda et al. | ................. 711/162 |
| 2006/0031381 | A1 * | 2/2006 | Van Luijt et al. | ............. 709/217 |

FOREIGN PATENT DOCUMENTS

| JP | 2003-044446 | 2/2003 |
| JP | 2003-255970 | 9/2003 |
| JP | 2004-157790 | 6/2004 |
| WO | WO 2004052009 A2 * | 6/2004 |

OTHER PUBLICATIONS

Office Action issued by the Patent Office of Japan for related Japanese Application No. 2005-373331 mailed Dec. 21, 2010.

* cited by examiner

*Primary Examiner* — Vivek Srivastava
*Assistant Examiner* — Anthony Brown
(74) *Attorney, Agent, or Firm* — Greer, Burns & Crain, Ltd.

(57) ABSTRACT

A job administrator terminal embeds control information in service data and transmits the service data to a job executor terminal. The job executor terminal receives the service data, extracts the control information from the service data, and stores the control information in a storing unit. When the job administrator terminal provides a service to the job executor terminal, the job administrator terminal controls provision of the service based on the control information and environmental information of the job executor terminal.

14 Claims, 20 Drawing Sheets

FIG.2

EVALUATION DB
15a

| ENVIRONMENTAL INFORMATION OF VENDOR PRODUCT (VENDOR NAME, PRODUCT NAME, VERSION, ETC.) | HASHED ENVIRONMENTAL INFORMATION | EVALUATION VALUE | | |
|---|---|---|---|---|
| | | SECURITY | PERFOR-MANCE | ... |
| COMPANY A, OS-A, VERSION 2002, ... | (HASH VALUE OF ENVIRONMENTAL INFORMATION) | 90 | 70 | ... |
| COMPANY A, OS-A, VERSION 2000, ... | (HASH VALUE OF ENVIRONMENTAL INFORMATION) | 80 | 70 | ... |
| COMPANY B, CPU-B, VERSION 95, ... | (HASH VALUE OF ENVIRONMENTAL INFORMATION) | 80 | 90 | ... |
| COMPANY C, MEMORY-C, VERSION 5, ... | (HASH VALUE OF ENVIRONMENTAL INFORMATION) | 80 | 60 | ... |
| ⋮ | ⋮ | ⋮ | ⋮ | ⋮ |

FIG.3

AUTHENTICATION DB
15b

| HASHED CONTROL INFORMATION | CONTROL INFORMATION | |
|---|---|---|
| | IDENTIFICATION INFORMATION | RESTRICTION INFORMATION |
| (HASH VALUE OF CONTROL INFORMATION) | COMPUTER PROGRAM A | JOB EXECUTOR ID (U0001), COMPANY A, CPU-A... |
| (HASH VALUE OF CONTROL INFORMATION) | COMPUTER PROGRAM B | JOB EXECUTOR ID (U0021), COMPANY B, MEMORY-B... |
| (HASH VALUE OF CONTROL INFORMATION) | IMAGE DATA C | JOB EXECUTOR ID (U0033), COMPANY C, BIOS-D... |
| ⋮ | ⋮ | ⋮ |

FIG.4

SERVICE POLICY DB
25a

| SERVICE ID | SERVICE PROVISION CONDITION | ENVIRONMENTAL-INFORMATION-ACQUISITION COMMAND ID |
|---|---|---|
| S0001 | SECURITY: 90 OR MORE PERFORMANCE: 80 OR MORE | COMMAND ID1 (ACQUIRE ENVIRONMENTAL INFORMATION OF OS) |
| S0002 | SECURITY: 80 OR MORE | COMMAND ID2 (ACQUIRE ENVIRONMENTAL INFORMATION OF OS AND CPU) |
| S0003 | SECURITY: 70 OR MORE PERFORMANCE: 80 OR MORE | COMMAND ID3 (ACQUIRE ENVIRONMENTAL INFORMATION OF CPU) |
| ⋮ | ⋮ | ⋮ |

FIG.5

JOB EXECUTOR DB
25b

| JOB EXECUTOR ID | JOB EXECUTOR NAME | SERVICE HISTORY | | | |
|---|---|---|---|---|---|
| | | DATE AND TIME | SERVICE ID | EVALUATION VALUE | CONTROL CONTENT |
| U0001 | ○○○○ | 050301/ 2200 | S0001 | SECURITY: 90 PERFORMANCE: 90 | TRANSMIT DATA FOR 200K |
| U0002 | △△△△ | 050301/ 2300 | S0002 | SECURITY: 70 PERFORMANCE: 90 | REJECT DATA TRANSMISSION |
| ⋮ | ⋮ | ⋮ | ⋮ | ⋮ | ⋮ |

FIG.6

JOB SERVICE DB
25c

| SERVICE ID | SERVICE NAME (VIDEO CONTENT NAME) | CONTENT DATA |
|---|---|---|
| S0001 | AAA | (DATA FOR 56K) (DATA FOR 200K) |
| S0002 | BBB | (DATA FOR 200K) |
| S0003 | CCC | (DATA FOR 56K) (DATA FOR 200K) |
| ⋮ | ⋮ | ⋮ |

FIG.7

ENVIRONMENTAL-INFORMATION-ACQUISITION COMMAND DB
35a

| SERVICE ID | ENVIRONMENTAL-INFORMATION ACQUISITION ID |
|---|---|
| S0001 | COMMAND ID1 (ACQUIRE ENVIRONMENTAL INFORMATION OF OS) |
| S0002 | COMMAND ID2 (ACQUIRE ENVIRONMENTAL INFORMATION OF OS AND CPU) |
| S0003 | COMMAND ID3 (ACQUIRE ENVIRONMENTAL INFORMATION OF CPU) |
| ⋮ | ⋮ |

FIG.8

ENVIRONMENTAL INFORMATION TABLE
45a

| ENVIRONMENTAL INFORMATION OF USER TERMINAL |
|---|
| COMPANY A, OS-A, VERSION 2002, ··· |
| ... |
| COMPANY B, CPU-B, VERSION 95, ··· |
| COMPANY C, MEMORY-C, VERSION 5, ··· |
| ... |
| COMPANY D, BIOS-D, VERSION 1.5, ··· |
| ⋮ |

FIG.9

DIGITAL WATERMARK/ STEGANOGRAPHY INFORMATION DB
45b

| CONTROL INFORMATION | | |
|---|---|---|
| IDENTIFICATION INFORMATION | RESTRICTION INFORMATION | SERVICE ID |
| COMPUTER PROGRAM A | JOB EXECUTOR ID (U0001), COMPANY A, CPU-A··· | S0001 |
| COMPUTER PROGRAM D | JOB EXECUTOR ID (U0001), COMPANY B, MEMORY-B··· | S0003 |
| ⋮ | ⋮ | ⋮ |

FIG.19

| RESTRICTION INFORMATION ID | IDENTIFICATION INFORMATION | RESTRICTION INFORMATION |
|---|---|---|
| R0001 | COMPUTER PROGRAM A | JOB EXECUTOR ID (U0001), COMPANY A, CPU-A, ... |
| R0010 | COMPUTER PROGRAM A | JOB EXECUTOR ID (U0010), COMPANY A, CPU-A, ... |
| ... | ... | ... |
| R0023 | COMPUTER PROGRAM B | JOB EXECUTOR ID (U0001), COMPANY B, MEMORY-B, ... |
| ... | ... | ... |

RESTRICTION-INFORMATION MANAGEMENT DB
15c

FIG.20

| IDENTIFICATION INFORMATION | JOB-EXECUTION-HISTORY MANAGEMENT INFORMATION | | | JOB EXECUTOR ID |
|---|---|---|---|---|
| | RESTRICTION INFORMATION | PROCESSING CONTENT | DATE AND TIME | |
| COMPUTER PROGRAM A | JOB EXECUTOR ID (U0001), COMPANY A, CPU-A, ... | EXECUTE | 2001, 9, 15, 13, 40 | U0001 |
| COMPUTER PROGRAM B | JOB EXECUTOR ID (U0001), COMPANY A, MEMORY-A, ... | COPY | 2001, 9, 16, 10, 30 | U0001 |
| ... | ... | ... | ... | ... |
| COMPUTER PROGRAM A | JOB EXECUTOR ID (U0001), COMPANY B, CPU-B, ... | TRANSMIT TO TERMINAL B | 2001, 9, 20, 12, 10 | U0001 |
| ... | ... | | | ... |

JOB-EXECUTION-HISTORY MANAGEMENT DB
15d

FIG.21

JOB-EXECUTION-HISTORY INFORMATION DB 50a

| IDENTIFICATION INFORMATION | JOB-EXECUTION-HISTORY INFORMATION | | |
|---|---|---|---|
| | RESTRICTION INFORMATION | PROCESSING CONTENT | DATE AND TIME |
| COMPUTER PROGRAM A | JOB EXECUTOR ID (U0001), COMPANY A, CPU-A, ... | EXECUTE | 2001, 6, 15, 13, 40 |
| COMPUTER PROGRAM B | JOB EXECUTOR ID (U0001), COMPANY A, MEMORY-B, ... | COPY | 2001, 9, 16, 10, 30 |
| ... | ... | ... | ... |
| COMPUTER PROGRAM A | JOB EXECUTOR ID (U0001), COMPANY B, CPU-A, ... | TRANSMIT TO TERMINAL B | 2001, 9, 20, 12, 10 |
| ... | ... | ... | ... |

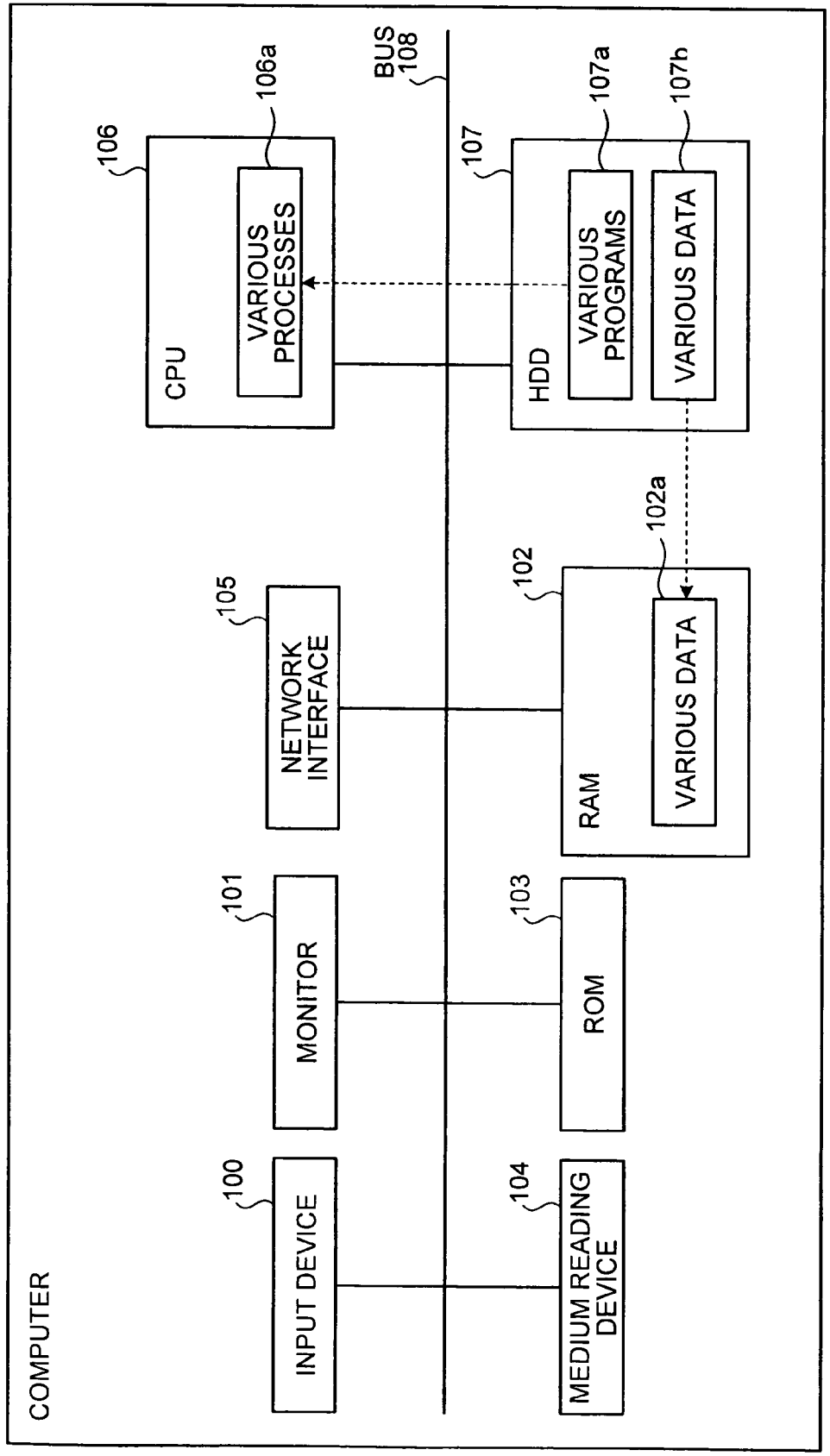

DATA-USE RESTRICTING METHOD AND COMPUTER PRODUCT

BACKGROUND OF THE INVENTION

1. Field of the Invention

The present invention generally relates to providing contents from a service provider to a user, and specifically relates to preventing illegal use of the contents by an unauthorized user.

2. Description of the Related Art

When a service provider terminal provides service to a user terminal, to ensure security of the service, the service is only provided after checking the environment of the user terminal. Japanese Patent Application Laid-Open No. 2004-157790, for example, discloses acquiring the environment of the user terminal before providing a service to the user terminal.

When a service provider provides service to the user terminal, the service provider transmits data and computer programs used realizing the service of the user terminal to the user terminal. However, it is likely that the data and the computer programs sent from the service provider get leaked or tapped and illegally used by a malicious user.

Thus, there is a need of a technology that prevents illegal use of data and computer programs sent from the service provider to the user terminal.

SUMMARY OF THE INVENTION

It is an object of the present invention to at least partially solve the problems in the conventional technology.

According to an aspect of the present invention, a data-use restricting system that restricts unauthorized use of service data includes an embedding unit that embeds control information in the service data, wherein the control information includes information on environment of a user terminal and a user of the user terminal permitted to use the service data; a transmitting unit that transmits the service data to a plurality of user terminals; an extracting unit that extracts the control information from the service data; and a restricting unit that restricts use of the service data based on extracted control information and information on an environment of the user terminal and the user.

According to another aspect of the present invention, a method of restricting unauthorized use of service data includes embedding control information in the service data, wherein the control information includes information on environment of a user terminal and a user of the user terminal permitted to use the service data; transmitting the service data to a plurality of user terminals; extracting the control information from the service data; and restricting use of the service data based on extracted control information and information on an environment of the user terminal and the user.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table of an example of information stored in an evaluation database (DB) shown in FIG. 1;

FIG. 3 is a table of an example of information stored in an authentication DB shown in FIG. 1;

FIG. 4 is a table of an example of information stored in a service policy DB shown in FIG. 1;

FIG. 5 is a table of an example of information stored in a job executor DB shown in FIG. 1;

FIG. 6 is a table of an example of information stored in a job service DB shown in FIG. 1;

FIG. 7 is a table of an example of information stored in an environmental-information-acquisition command DB shown in FIG. 1;

FIG. 8 is a table of an example of information stored in an environmental information table shown in FIG. 1;

FIG. 9 is a table of an example of information stored in a digital watermark/steganography information DB shown in FIG. 1;

FIG. 19 is a table of an example of information recorded (i.e., stored) in a restriction-information management DB shown in FIG. 18;

FIG. 20 is a table of an example of information recorded in a job-execution-history management DB shown in FIG. 18;

FIG. 21 is a table of an example of information stored in a job-execution-history information DB shown in FIG. 18;

FIG. 26 is a diagram of a hardware configuration of a computer that implements the processes, methods, or steps according to the embodiments.

DETAILED DESCRIPTION OF THE PREFERRED EMBODIMENTS

Figure 1:
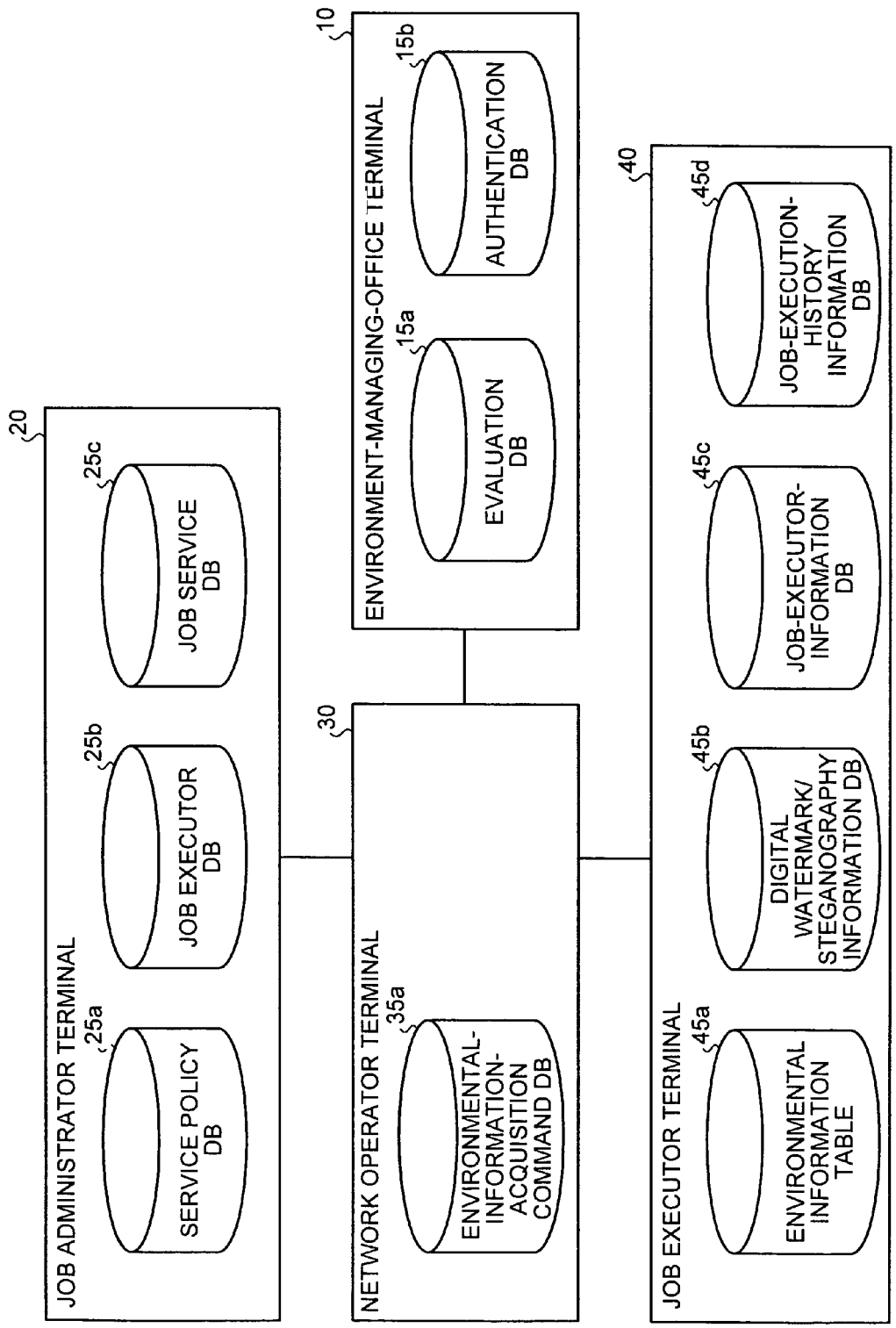
FIG. 1 is a block diagram of a data-use restricting system according to a first embodiment of the present invention.

Exemplary embodiments of the present invention are explained in detail below with reference to the accompanying drawings.

A data-use restricting system according to the embodiments restricts use of service data that a service provider terminal transmits to provide a user terminal when providing a service. Specifically, the service is a service for providing contents such as a movie or music, a computer program for executing predetermining processing, and the like from a service provider terminal (hereinafter, "job administrator terminal") to a user terminal (hereinafter, "job executor terminal") via a network. The data-use restricting system prevents contents or computer programs transmitted from being illegally used (or used against an intension of a service provider) in the service.

The job executor terminal embeds, using a digital watermark or steganography, information for restricting use of contents, computer programs, image data, or the like in service data required for providing a service. As an example of data embedded in the service data (hereinafter, "control information"), information on users who can execute the contents, information on hardware permitted to execute the contents, and the like are included.

The job executor terminal, which has received the service data, automatically extracts the control information embedded in the service data and records the control information in a storage device (e.g., trusted computing group (TCG) chip) inaccessible by users. When the job executor terminal receives service from the job administrator terminal, the job executor terminal transmits the control information, information on the user, environmental information of the job executor terminal to an environment managing office, which is a third party authority. The environment managing office judges, based on the control information, the information on the user, and the environmental information received, whether the contents are illegally used, and transmits a result of the judgment to the job administrator terminal.

The environmental information indicates information on software (an operating system (OS), a basic input output system (BIOS), a browser, plug-in software, etc.) and hardware (a central processing unit (CPU), a memory, a protocol control information (PCI) board, etc.) built in the job executor terminal.

The job administrator terminal receives the judgment result from the environment managing office. When the contents are legally used, the job administrator terminal continues the service provision to the job executor terminal. On the other hand, when the contents are illegally used, the job administrator terminal stops the service to the job executor terminal and gives a warning or the like to the job executor terminal.

In this way, the data-use restricting system according to the first embodiment embeds the control information in the service data using the digital watermark or the steganography and transmits the service data to the job executor terminal. The data-use restricting system controls and restricts service provision based on the control information, the information on the user, and the environmental information at the time of service provision. Thus, it is possible to prevent the contents from being illegally used.

FIG. 1 is a block diagram of a structure of the data-use restricting system according to the first embodiment. The data-use restricting system includes an environment-managing-office terminal 10, a job administrator terminal 20, a network operator terminal 30, and a job executor terminal 40. It is assumed that the respective terminals 10 to 40 are connected to one another via a network such as the Internet, a local area network (LAN), a public telephone network.

The environment-managing-office terminal 10 is a server computer owned by the environment managing office. The environment-managing-office terminal 10 includes an evaluation DB 15a and an authentication DB 15b. The evaluation DB 15a stores therein evaluation values of vendor products that could be built in the job executor terminal 40. The authentication DB 15b stores therein information for judging whether contents are appropriately processed within a range of restriction. FIG. 2 is a table of an example of information stored in the evaluation DB 15a. FIG. 3 is a diagram of an example of information stored in the authentication DB 15b.

As shown in FIG. 2, the evaluation DB 15a contains environmental information of the vendor products, hashed environmental information, and evaluation values in association with one another. The "environmental information" and the "hashed environmental information" are registered in the evaluation DB 15a every time information on software and hardware, which could be built in the job executor terminal 40, is acquired from apparatus vendors. The "evaluation value" is determined from the viewpoint of security and performance based on vulnerability and ability of the vendor products when the vendor products are acquired. The "evaluation value" is registered in association with the "environmental information" and the "hashed environmental information". Moreover, the "evaluation value" registered in this way is reviewed, updated, and registered when new vulnerability (security hole) is found or if higher performance is devised in future. In the first embodiment, the "evaluation value" includes a "security evaluation value" determined from the viewpoint of security based on vulnerability of the vendor products and a "performance evaluation value" determined from the viewpoint of performance based on ability of the vendor products.

As shown in FIG. 3, the authentication DB 15b stores hashed control information and control information in association with each other. The "hashed control information" and the "control information" are registered in the authentication DB 15b every time new control information is generated by the job administrator terminal 20. In an example shown in a first column in FIG. 3, it is indicated that only a terminal that is used by a user having a job executor ID (U0001) and includes a CPU-A of a company A is permitted to use a computer program A. Information registered in the authentication DB 15b is information provided from the service provider on line or off line.

The job administrator terminal 20 is a server computer owned by the service provider. The job administrator terminal 20 includes a service policy DB 25a, a job executor DB 25b, and a job service DB 25c. The service policy DB 25a stores therein a policy for provision of a service. FIG. 4 is a table of an example of information stored in the service policy DB 25a.

As shown in FIG. 4, the service policy DB 25a stores a service ID of each contents (service), a service provision condition (an evaluation value necessary for provision of each contents), and an environmental information acquisition command ID (a command defining a type of environmental information used for evaluation) in association with each other. It is possible to realize service control or the like for providing only a terminal not having a low evaluation point (e.g., an invulnerable terminal, a terminal not having low performance, etc.) with contents according to a way of setting the "evaluation value" as the service provision condition. The "environmental information acquisition command ID" is defined for each service because an evaluation object (e.g., only security of an OS, only performance of a CPU, security and performance of the OS and the CPU, etc.) could be different for each service.

The job executor DB 25b stores therein information on a service user. FIG. 5 is a table of an example of information stored in the job executor DB 25b. The job executor DB 25b stores, for each service user, a job executor ID for uniquely identifying the service user, a job executor name, and a service history (a service control date and time, a service ID, an evaluation value used for service control, and an execution result of the service control) in association with one another. The "service history" is registered when service control processing described later is performed.

The job service DB 25c stores therein service information (e.g., contents) provided by the service provider. FIG. 6 is a table of an example of information stored in the job service DB 25c. The job service DB 25c stores, for each service (contents), a service ID for uniquely identifying each contents, a service name (a video contents name), and contents data in association with one another. As the contents data, even if contents are identical, data of a high image quality suitable for provision to the job executor terminal 40 with high performance and data of a low image quality suitable for the job executor terminal 40 with low performance are stored.

Before providing the contents, the job administrator terminal 20 embeds the control information in service data (including computer programs and the like required when the contents is reproduced) using the digital watermark or the steganography and transmits the service data to the job executor terminal 40. The control information may be embedded in the contents transmitted at the time of service provision.

The network operator terminal 30 is a server computer owned by a network operator. The network operator terminal 30 includes an environmental-information-acquisition command DB 35a. The environmental-information-acquisition command DB 35a stores therein information related to the environmental-information-acquisition command ID. FIG. 7 is a table of an example of information stored in the environmental-information-acquisition command DB 35a. The environmental-information-acquisition command DB 35a stores, for each service (contents) provided by the service provider, a service ID and an environmental-information-acquisition command ID in association with each other. As the service ID and the environmental-information-acquisition command ID, those provided from the service provider on line or off line are registered.

The job executor terminal 40 is a communication terminal such as a personal computer or a workstation, a game machine for home use, an Internet TV, a personal digital assistant (PDA), or a cellular phone or a personal handyphone system (PHS) used by the service user. The job executor terminal 40 includes an environmental information table 45a, a digital watermark/steganography information DB 45b, a job-executor-information DB 45c, and a job-execution-history information DB 45d.

The environmental information table 45a stores therein information on an environment of the job executor terminal 40. FIG. 8 is a table of an example of information stored in the environmental information table 45a. As shown in the figure, the environmental information table 45a stores environmental information of the software (the OS, the BIOS, the browser, the plug-in software, etc.) and the hardware (the CPU, the memory, the PCI board, etc.) built in the job executor terminal, hardware connected to the job executor terminal 40, and the like, respectively. The job executor terminal 40 collects such environmental information at the time of startup of the job executor terminal 40 and registers the environment information in the environmental information table 45a. When software is installed anew or hardware is connected anew after the startup, the job executor terminal 40 also collects the environmental information and registers the environmental information in the environmental information table 45a.

The digital watermark/steganography information DB 45b stores therein control information embedded in service data. FIG. 9 is a table of an example of information stored in the digital watermark/steganography information DB 45b. As shown in the figure, the digital watermark/steganography information DB 45b stores control information. For example, it is seen that a service ID "0001" uses a "computer program A", a job executor ID admitted to use the computer program A is "U0001", and a restriction of hardware admitted to use the computer program A is a "CPU of a company A" (the restriction of the computer program A shown in the figure is an example).

Before receiving provision of a service, the job executor terminal 40 acquires service data, which is required for receiving provision of the service, from the job administrator terminal 20 in advance. The job executor terminal 40 extracts control information from the service data and registers the control information extracted in the digital watermark/steganography information DB 45b.

Figure 10:
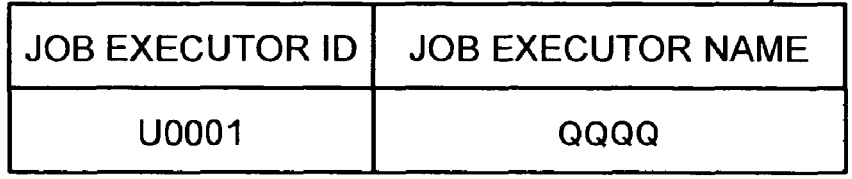
FIG. 10 a table of an example of information stored in a job-executor-information DB shown in FIG. 1.

The job-executor-information DB 45c stores therein information on a user. FIG. 10 is a table of an example of information stored in the job-executor-information DB 45c. As shown in the figure, the job-executor-information DB 45c stores a job executor ID and a job executor name that uniquely identifies a user. It is assumed that information stored in the job-executor-information DB 45c is guaranteed by an authentication office or the like, which is a third party authority. A user cannot update the information stored in the job-executor-information DB 45c without permission of the authentication office.

Figure 11:
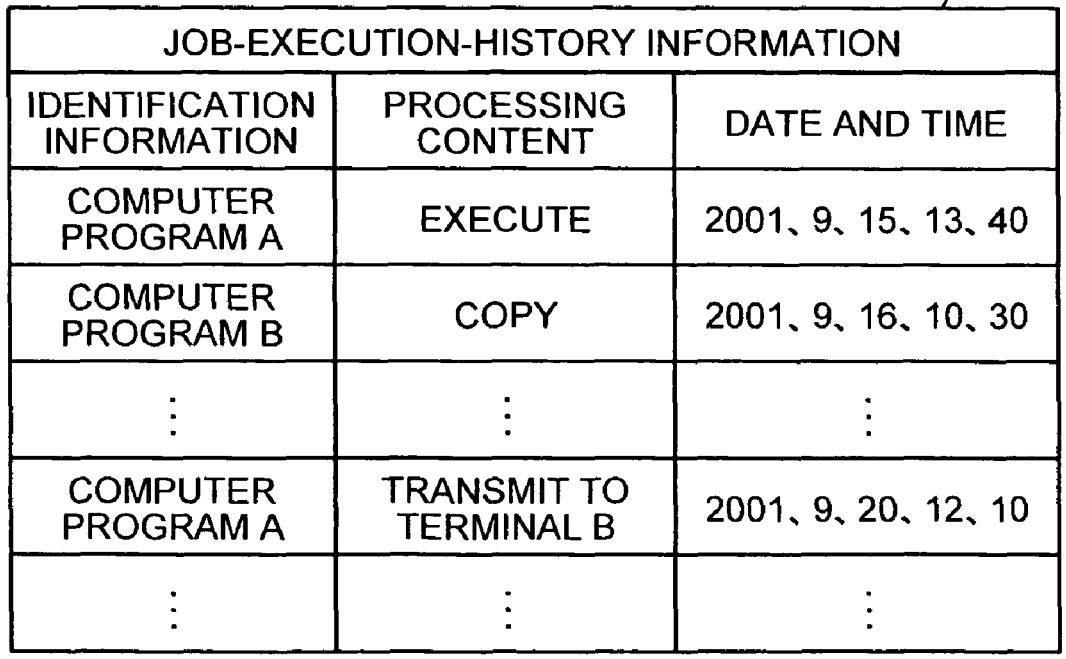
FIG. 11 is a table of an example of information stored in a job-execution-history information DB shown in FIG. 1.

The job-execution-history information DB 45d stores therein history information of processing performed by the job executor terminal 40. FIG. 11 is a table of an example of information stored in the job-execution-history information DB 45d. As shown in the figure, the job-execution-history information DB 45d stores history information of processing performed by the job executor terminal 40 (hereinafter, "job execution history information"). For example, according to the history information stored in the job-execution-history information DB 45d, a "computer program A" is "executed" at "13:40, Sep. 15, 2001".

Figure 12:
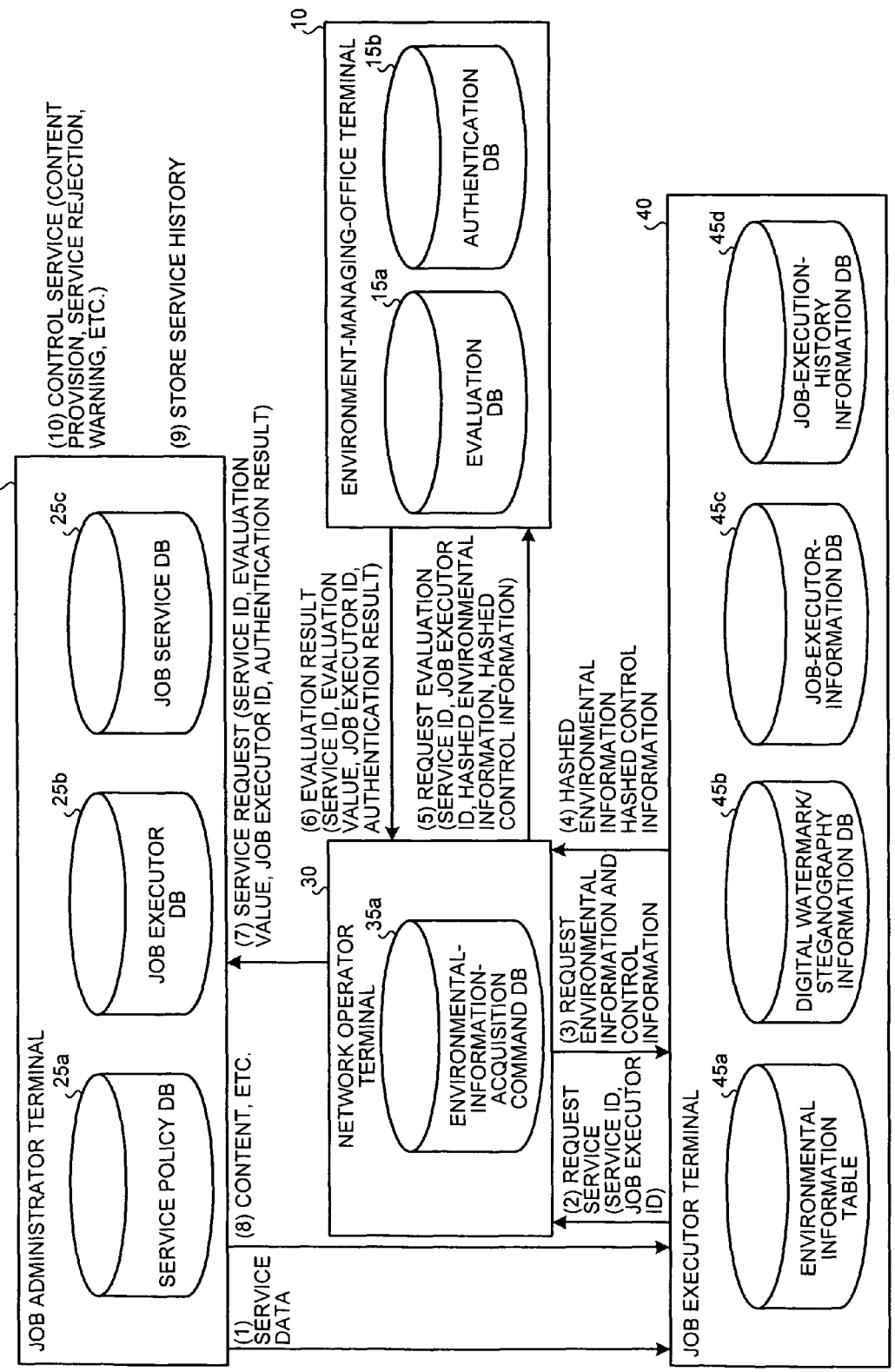
FIG. 12 is a diagram for explaining processing at the time of service provision and restriction in the data-use restricting system shown in FIG. 1.

FIG. 12 is a diagram for explaining processing at the time of service provision and restriction in the data-use restricting system.

As shown in FIG. 12, the job administrator terminal 20 embeds control information in service data required for performing service provision and transmits the service data to the job executor terminal 40. The job executor terminal 40 extracts the control information from the service data and registers the control information extracted in the digital watermark/steganography information DB 45b.

Subsequently, the job executor terminal 40 sends a service request (e.g., a hypertext transfer protocol (HTTP) message) including a service ID and a job executor ID to the network operator terminal 30. When the network operator terminal 30 acquires the service request, the network operator terminal 30 transmits an environmental-information-acquisition command ID corresponding to the service ID to the job executor terminal 40 and requests the job executor terminal 40 to send control information corresponding to the service ID as well.

When the job executor terminal 40 receives the request for environmental information and control information, the job executor terminal 40 retrieves environmental information corresponding to the environmental-information-acquisition command ID from the environmental information table 45a. The job executor terminal 40 also retrieves control information corresponding to the service ID from the digital watermark/steganography information DB 45b. The job executor terminal 40 hashes the environmental information and the control information retrieved and transmits the hashed environmental information and control information to the network operator terminal 30. In the following description, the environmental information hashed is represented as hashed environmental information and the control information hashed is represented as hashed control information.

When the network operator terminal 30 acquires the hashed environmental information and the hashed control information from the job executor terminal 40, the network operator terminal 30 transmits the service ID, the job executor ID, the hashed environmental information, and the hashed control information to the environment-managing-office terminal 10 as an evaluation request.

The environment-managing-office terminal 10, which has acquired the evaluation request, reads out an evaluation value corresponding to the hashed environmental information from the evaluation DB 15a to calculate an evaluation value. The environment-managing-office terminal 10 compares the job executor ID, the hashed environmental information, and the information stored in the authentication DB 15b, judges whether an authentication condition is satisfied (i.e., contents are used by the job executor terminal 40 within a range restricted by the control information), and generates an authentication result. The authentication result includes information like "the job executor terminal 40 is illegally using the computer program A" or "no illegal act is performed". The environment-managing-office terminal 10 transmits the service ID, the evaluation value, the job executor ID, and the authentication result to the network operator terminal 30 as an evaluation result.

The network operator terminal 30, which has acquired the evaluation result, transmits the service ID, the evaluation value, the job executor ID, and the authentication result to the job administrator terminal 20 as a service request. The job administrator terminal 20, which has received the service request, refers to the authentication result and judges whether the job executor terminal 40 satisfies a restriction condition of the control information. When the job executor terminal 40 does not satisfy the restriction condition, the job administrator terminal 20 immediately transmits a warning or the like to the job executor terminal 40 and stops the service provision.

On the other hand, when the job executor terminal 40 satisfies the restriction condition of the control information, the job administrator terminal 20 judges, with reference to the service policy DB 25a, whether the evaluation value included in the service request satisfies a service provision condition of the service ID also included in the service request. Then, the job administrator terminal 20 controls a service provided to the job executor terminal 40.

As an example, the job administrator terminal 20 reads out contents requested from the job service DB 25d and provides the job executor terminal 40 satisfying the evaluation value of the service provision condition with the contents. However, the job administrator terminal 20 rejects provision of the contents to the job executor terminal 40 not satisfying the evaluation value of the service condition. The job administrator terminal 20 reads out contents data of a low image quality from the job service DB 25c and provides the job executor terminal 40 having a low performance evaluation value with the contents data. In this way, the job administrator terminal 20 executes service control corresponding to a service policy defined in the service policy DB 25a. It is also possible to advise a service user how a requested service can be provided, although the requested service cannot be provided in the present state. Specifically, the job administrator terminal 20 can urge the service user to use a service rather than rejecting the use by notifying the user that "the service is provided if the user updates an OS".

Moreover, the job administrator terminal 20 registers a service history in the job executor DB after execution of the service. Specifically, the job administrator terminal 20 registers a service history including a service control date and time, a service ID, an evaluation value used for service control, and an execution result of the service control in the job executor DB 25b in association with the job executor ID and the job executor name of the user who has requested the service. According to the series of processing, it is possible to control the service without the contents being illegally used by a malicious third party.

Figure 13:
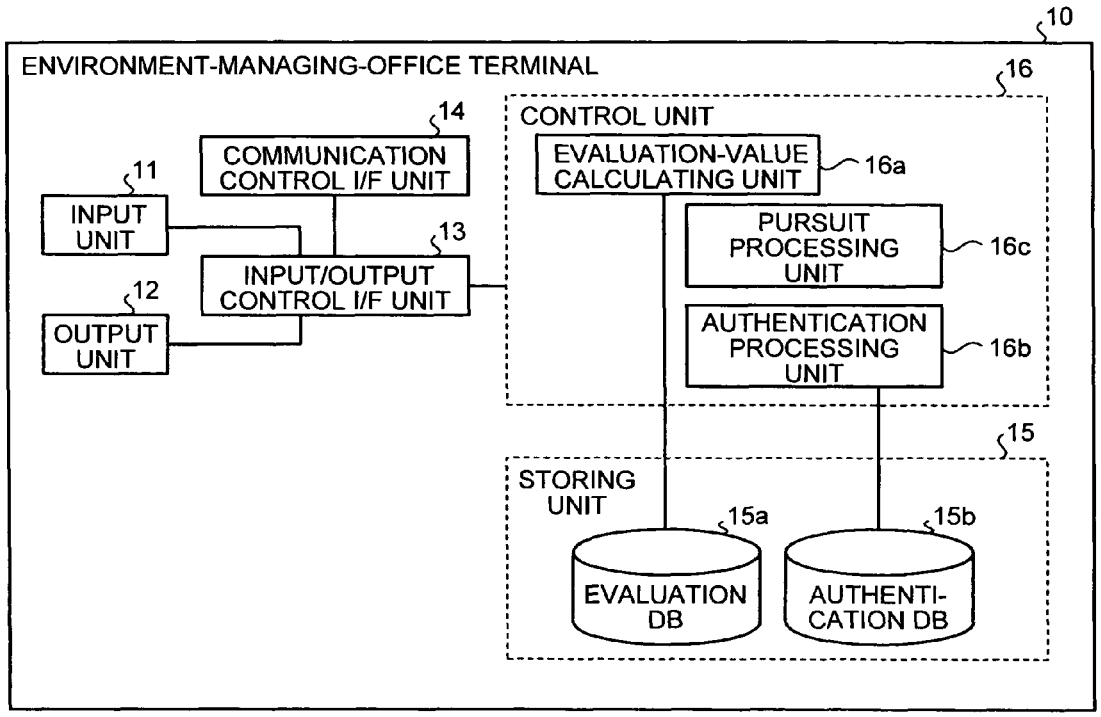
FIG. 13 is a detailed functional block diagram of an environment-managing-office terminal shown in FIG. 1.

FIG. 13 is a detailed functional block diagram of the environment-managing-office terminal 10. As shown in the figure, the environment-managing-office terminal 10 includes an input unit 11, an output unit 12, an input/output control interface (I/F) unit 13, a communication control I/F unit 14, a storing unit 15, and a control unit 16.

The input unit 11 is inputting means for inputting various kinds of information and includes a keyboard, a mouse, and a microphone. For example, the input unit 11 receives various kinds of information stored in the evaluation DB 15a and the authentication DB 15b from an operator in the environment managing office and inputs the information. A monitor (the output unit 12) described later also realizes a pointing device function in cooperation with the mouse.

The output unit 12 is outputting means for outputting various kinds of information and includes a monitor (or a display or a touch panel) and a speaker. For example, the output unit 12 outputs the various kinds of information stored in the evaluation DB 15a and the authentication DB 15b. The input/output control I/F unit 13 is means for controlling the input and output of data by the input unit 11 and the output unit 12. The communication control I/F unit 14 is means for mainly controlling communication between the environment-managing-office terminal 10 and the network operator terminal 30.

The storing unit 15 stores therein data and computer programs necessary for various kinds of processing by the control unit 16 and includes the evaluation DB 15a and the authentication DB 15b.

The control unit 16 is control means that has an internal memory for storing computer programs and control data defining various processing procedures and executes various kinds of processing according to the computer programs and the control data. The control unit 16 includes an authentication processing unit 16b and a pursuit processing unit 16c.

An evaluation-value calculating unit 16a is a processing unit that evaluates an environment related to the job executer terminal 40 and calculates an evaluation value. Specifically, when hashed environmental information and a service ID included in an evaluation request are received from the network operator terminal 30, the evaluation-value calculating unit 16a calculates an evaluation value by reading out an evaluation value corresponding to the hashed environmental information included in the request from the evaluation DB 15a.

The authentication processing unit 16b is a processing unit that judges whether a computer program, image data, or the like recorded in the job executor terminal 40 is illegally used against an intension of the service provider. Specifically, when a job executor ID, hashed environmental information, and hashed control information included in an evaluation request is received, the authentication processing unit 16b compares the job executor ID, the hashed environmental information, and the hashed control information with the information stored in the authentication DB 15b and judges whether the computer program, the image data, or the like is illegally used.

For example, when restriction information of the control information with respect to the hashed control information is "job executor ID (U0001), company A, and CPU-A", the job executor ID received is "U0001", and "company A and CPU-A" is included in an environment specified by the hashed environmental information and the evaluation DB 15a, the authentication processing unit 16b judges that the computer program, the image data, or the like is appropriately used.

When the job executor ID received does not coincide with a job executor ID of the restriction information or when an environment of the restriction information and an environment of the job executor terminal 40 are different, the authentication processing unit 16b judges that the computer program, the image data, or the like is illegally used.

The pursuit processing unit 16c is a processing unit that acquires job-execution-history information (stored in the job-executor history DB) from the job executor terminal 40 and watches whether the job executor terminal 40 illegally uses contents or the like. For example, despite a restriction that a computer program A included in the contents should not be transmitted to other terminals, when information indicating that the computer program A is transmitted to other terminals is left in the job-execution-history information, the pursuit processing unit 16c informs the job administrator terminal 20 to that effect. The job administrator terminal 20, which has acquired the information on the illegal use, gives a warning or the like to the job executor terminal 40. In other words, the pursuit processing unit 16c plays a role of restricting contents from being illegally used by the job executor terminal 40 after the service provision by the job administrator terminal 20 is completed.

Figure 14:
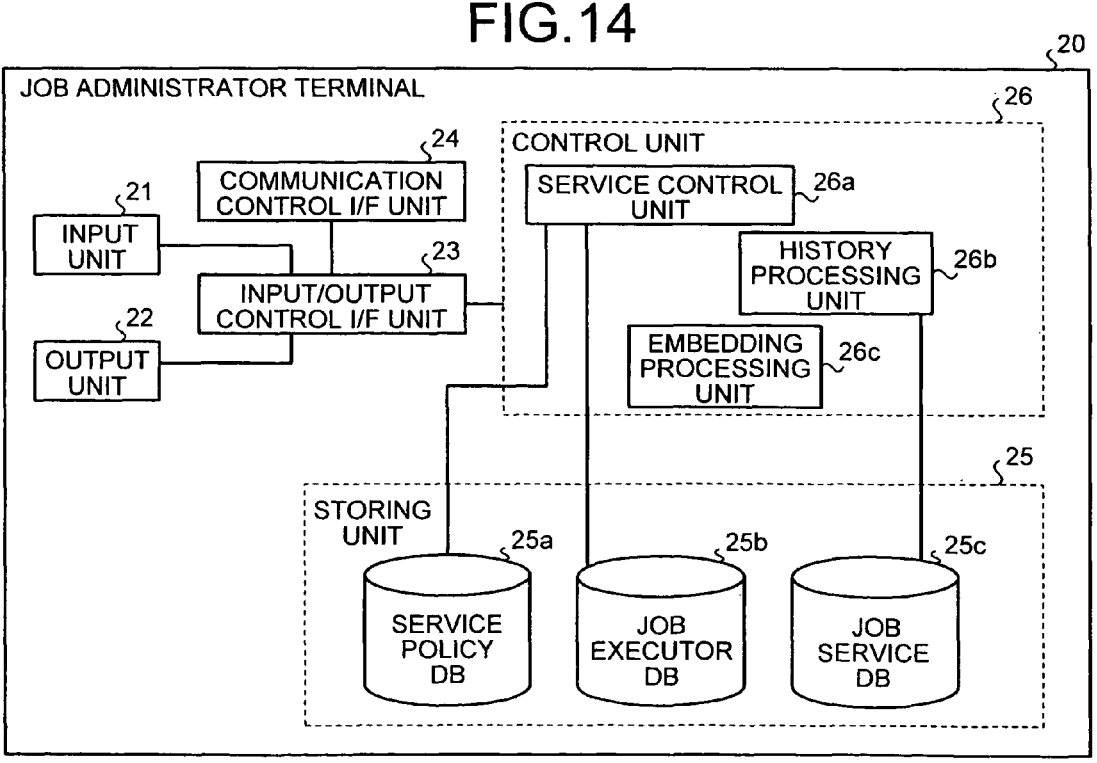
FIG. 14 is a detailed functional block diagram of a job administrator terminal shown in FIG. 1.

FIG. 14 is a detailed functional block diagram of the job administrator terminal 20. As shown in the figure, the job administrator terminal 20 includes an input unit 21, an output unit 22, an input/output control I/F unit 23, a communication control I/F unit 24, a storing unit 25, and a control unit 26.

The input unit 21 is inputting means for inputting various kinds of information and includes a keyboard, a mouse, and a microphone. For example, the input unit 21 receives various kinds of information stored in the service policy DB 25a, the job executor DB 25b, and the job service DB 25c from the service provider and inputs the information. A monitor (the output unit 22) described later also realizes a pointing device function in cooperation with the mouse.

The output unit 22 is outputting means for outputting various kinds of information and includes a monitor (or a display or a touch panel) and a speaker. For example, the output unit 22 outputs the various kinds of information and the like stored in the service policy DB 25a, the job executor DB 25b, and the job service DB 25c. The input/output control I/F unit 23 is means for controlling input and output of data by the input unit 21 and the output unit 22. The communication control I/F unit 24 is means for mainly controlling communication between the job administrator terminal 20 and the network operator terminal 30.

The storing unit 25 stores therein data and computer programs necessary for various kinds of processing by the control unit 26 and includes the service policy DB 25a, the job executor DB 25b, and the job service DB 25c.

The control unit 26 is control means that has an internal memory for storing computer programs and control data defining various processing procedures and executes various kinds of processing according to the computer programs and the control data. The control unit 26 includes a service control unit 26a, a history processing unit 26b, and an embedding processing unit 26c.

The service control unit 26a is processing unit that controls, based on an evaluation value calculated by the environment-managing-office terminal 10, a service provided to the job executor terminal 40. Specifically, when a service ID, an evaluation value, and a job executor ID included in a service request are acquired from the network operator terminal 30, the service control unit 26a judges, with reference to the service policy DB 25a, whether the evaluation value included in the service request satisfies a service provision condition of the service ID also included in the service request. Then, the service control unit 26a controls the service provided to the job executor terminal 40.

The service control unit 26a controls service provision to the job executor terminal 40 based on an authentication result generated by the environment-managing-office terminal 10. Specifically, when the job executor terminal 40 is using a computer program or image data for contents against a restriction condition, the service control unit 26a gives a warning to the job executor terminal 40. On the other hand, when the job executor terminal 40 satisfies the restriction condition, the service control unit 26a performs service provision corresponding to the evaluation value.

Moreover, the service control unit 26a receives a judgment result based on job-execution-history information from the environment-managing-office terminal 10. When the job executor terminal 40 is illegally using the computer program, the service control unit 26a gives a warning to the job executor-terminal 40 in the same manner.

The history processing unit 26b is a processing unit that processes a history of a service provided to a service user. Specifically, after execution of service control by the service control unit 26a, the history processing unit 26b registers a service history including a service control date and time, a service ID, an evaluation value used for the service control, and an execution result of the service control in the job service DB 25c in association with the job executor ID and the job executor name of the service user who has requested the service.

The embedding processing unit 26c is a processing unit that embeds, using the digital watermark or the steganography, control information in service data including computer programs and image data required in executing contents and transmits the service data to the job executor terminal 40 to which a service is provided. The control information is inputted from the input unit 21 by the service provider.

As an example, it is assumed that the embedding processing unit 26c embeds the control information in the service data. However, the embedding processing unit 26c may embed the embedding information in the contents transmitted at the time of service provision.

Figure 15:
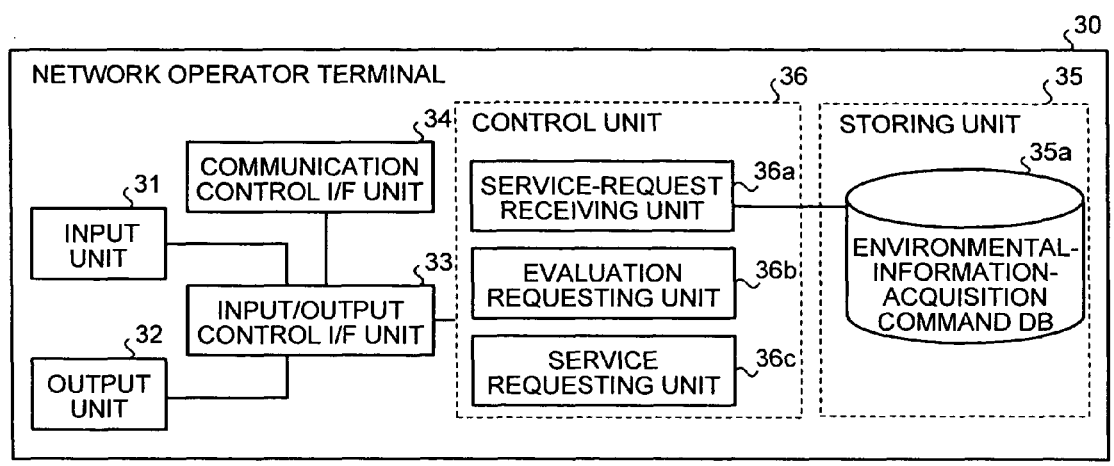
FIG. 15 is a detailed functional block diagram of a network operator terminal shown in FIG. 1.

FIG. 15 is a detailed functional block diagram of the network operator terminal 30. As shown in the figure, the network operator terminal 30 includes an input unit 31, an output unit 32, an input/output control I/F unit 33, a communication control I/F unit 34, a storing unit 35, and a control unit 36.

The input unit 31 is inputting means for inputting various kinds of information and includes a keyboard, a mouse, and a microphone. For example, the input unit 31 receives various kinds of information stored in the environmental-information-acquisition command DB 35a from the network operator and inputs the information. A monitor (the output unit 32) described later also realizes a pointing device function in cooperation with the mouse.

The output unit 32 is outputting means for outputting various kinds of information and includes a monitor (or a display or a touch panel) and a speaker. For example, the output unit 32 outputs the various kinds of information and the like stored in the environmental-information-acquisition command DB 35a. The input/output control I/F unit 33 is means for controlling the input and output of data by the input unit 31 and the output unit 32. The communication control I/F unit 34 is means for mainly controlling communication between the network operator terminal 30 and the environment-managing-office terminal 10, the job administrator terminal 20, and the job executor terminal 40.

The storing unit 35 stores therein data and computer programs necessary for various kinds of processing by the control unit 36 and includes the environmental-information-acquisition command DB 35a.

The control unit 36 is control means that has an internal memory for storing computer programs and control data defining various processing procedures and executes various kinds of processing according to the computer programs and the control data. The control unit 36 includes a service-request receiving unit 36a, an evaluation requesting unit 36b, and a service requesting unit 36c.

The service-request receiving unit 36a is a processing unit that receives a service request to the job administrator terminal 20 from the job executor terminal 40. Specifically, the service-request receiving unit 36a receives a service request message (e.g., an HTTP message) including a service ID of a service requested and a job executor ID of a service user from the service user. After receiving the service request message, the service-request receiving unit 36a transmits a request for environmental information and control information corresponding to the service ID to the job executor terminal 40.

The evaluation requesting unit 36b is a processing unit that receives environmental information and control information from the job executor terminal 40, transmits the environmental information and the control information received to the environment-managing-office terminal 10, and requests the environment-managing-office terminal 10 to calculate an evaluation value and authenticate the control information. Specifically, the evaluation requesting unit 36b transmits hashed environmental information, hashed control information, a service ID, and a job executor ID to the environment-managing-office terminal 10 and requests the environment-managing-office terminal 10 to calculate an evaluation value and authenticate the control information.

The service requesting unit 36c is a processing unit that acquires an evaluation value and an authentication result from the environment-managing-office terminal 10 and, then, transmits a service request including the service ID, the evaluation value, the job executor ID, and the authentication result to the job administrator terminal 20.

Figure 16:
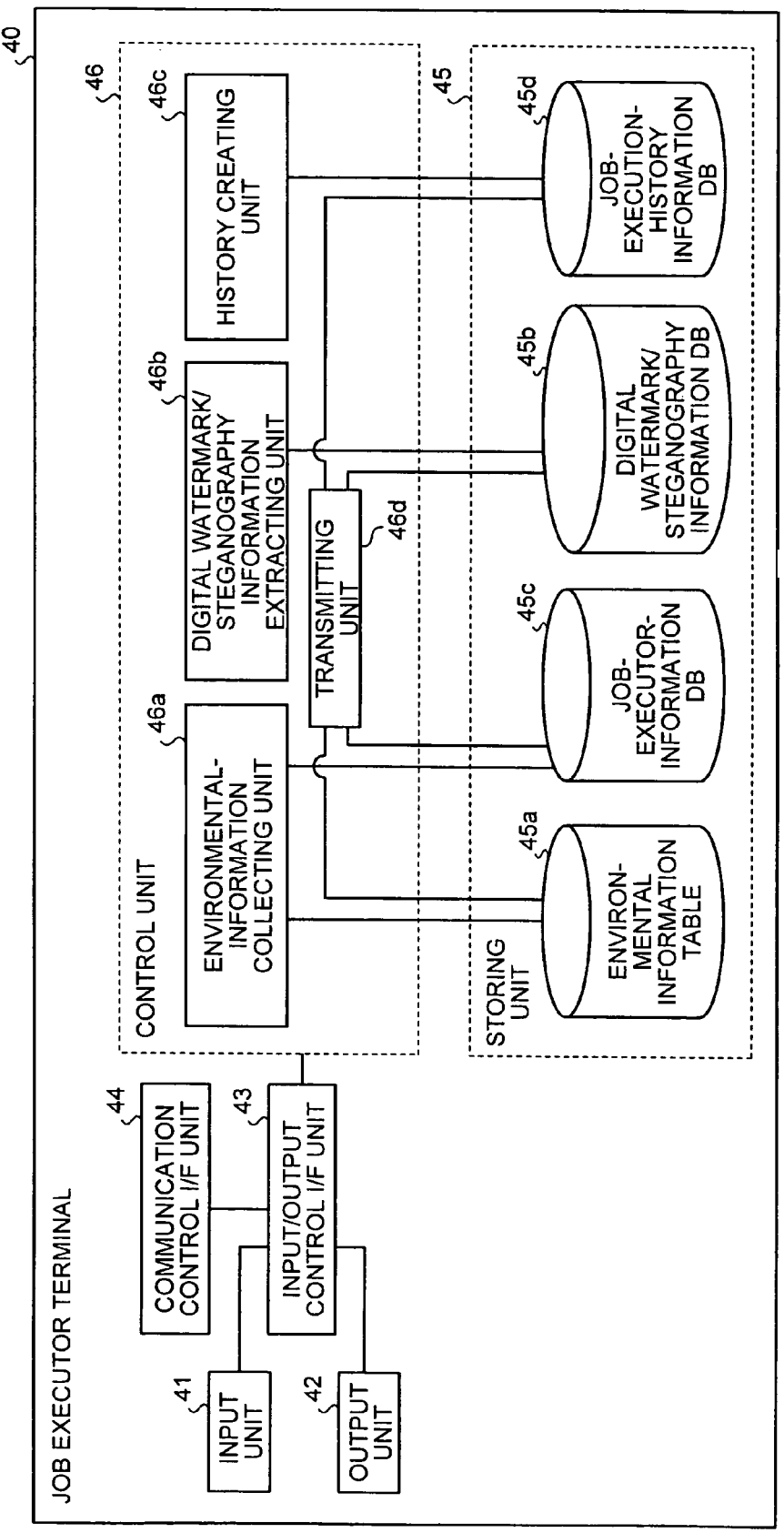
FIG. 16 is a detailed functional block diagram of a job executor terminal shown in FIG. 1.

FIG. 16 is a detailed functional block diagram of the job executor terminal 40. As shown in the figure, the job executor terminal 40 includes an input unit 41, an output unit 42, an input/output control I/F unit 43, a communication control I/F unit 44, a storing unit 45, and a control unit 46.

The input unit 41 is inputting means for inputting various kinds of information and includes a keyboard, a mouse, and a microphone. For example, the input unit 41 receives the service request including the service ID from a user and inputs the service request. A monitor (the output unit 42) described later also realizes a pointing device function in cooperation with the mouse.

The output unit 42 is outputting means for outputting various kinds of information and includes a monitor (or a display or a touch panel) and a speaker. For example, the output unit 42 outputs contents and the like provided from the job administrator terminal 20. The input/output control I/F unit 43 is means for controlling the input and output of data by the input unit 41 and the output unit 42. The communication control I/F unit 44 is means for mainly controlling communication between the job executor terminal 40 and the network operator terminal 30.

The storing unit 45 stores therein data and computer programs necessary for various kinds of processing by the control unit 46. The storing unit 45 includes the environmental information table 45a, the digital watermark/steganography information DB 45b, the job-executor-information DB 45c, and the job-execution-history information DB 45d.

The control unit 46 is control means that has an internal memory for storing computer programs and control data defining various processing procedures and executes various kinds of processing according to the computer programs and the control data. The control unit 46 includes an environmental-information collecting unit 46a, a digital watermark/steganography information extracting unit 46b, a history creating unit 46c, and a transmitting unit 46d.

The environmental-information collecting unit 46a is a processing unit that collects environmental information of the job executor terminal 40. Specifically, the environmental-information collecting unit 46a collects, when the job executor terminal 40 is started, environmental information of the job executor terminal 40 and registers the environmental information in the environmental information table 45a. When software is installed anew or hardware is connected anew after startup, the environmental-information collecting unit 46a also collects environmental information of the software and the hardware and registers the environmental information in the environmental information table 45a.

The digital watermark/steganography information extracting unit 46b is a processing unit that extracts the control information from the service data. Specifically, when the digital watermark/steganography information extracting unit 46b acquires service data required in providing a service from the job administrator terminal 20, the digital watermark/steganography information extracting unit 46b extracts control information embedded in service data (or in the contents) by the digital watermark or the steganography. The digital watermark/steganography information extracting unit 46b registers the control information extracted in the digital watermark/steganography information DB 45b. The digital watermark/steganography information extracting unit 46b automatically extracts the control information using, for example, a trusted computing group chip (TCG) chip.

The history creating unit 46c is a processing unit that creates a history of processing applied to contents, service data, and the like provided from the job administrator terminal 20. Specifically, the history creating unit 46c watches processing of the job executor terminal 40 applied to a computer program and image data included in the contents and the service data. For example, when the computer program is executed or when the computer program is transmitted to other terminals, the history creating unit 46c registers information indicating to that effect in the job-execution-history information DB 45d.

The information stored in the job-execution-history information DB 45d is periodically transmitted to the environment-managing-office terminal 10. Since the information stored in the job-execution-history information DB 45d is transmitted to the environment-managing-office terminal 10 in this way, the environment-managing-office terminal 10 is capable of preventing the contents from being used against an intension of the service provider.

The transmitting unit 46*d* is a processing unit that transmits environmental information and control information to the network operator terminal 30 at the time of service request. Specifically, when a request for environmental information and control information is received from the network operator terminal 30 in response to transmission of a service request including a service ID and a job executor ID, the transmitting unit 46*d* reads out relevant environmental information and control information from the environmental information table 45*a* and the digital watermark/steganography information DB 45*b*. Then, the transmitting unit 46*d* transmits hashed environmental information and hashed control information obtained by hashing the environmental information and the control information to the network operator terminal 30.

Figure 17:
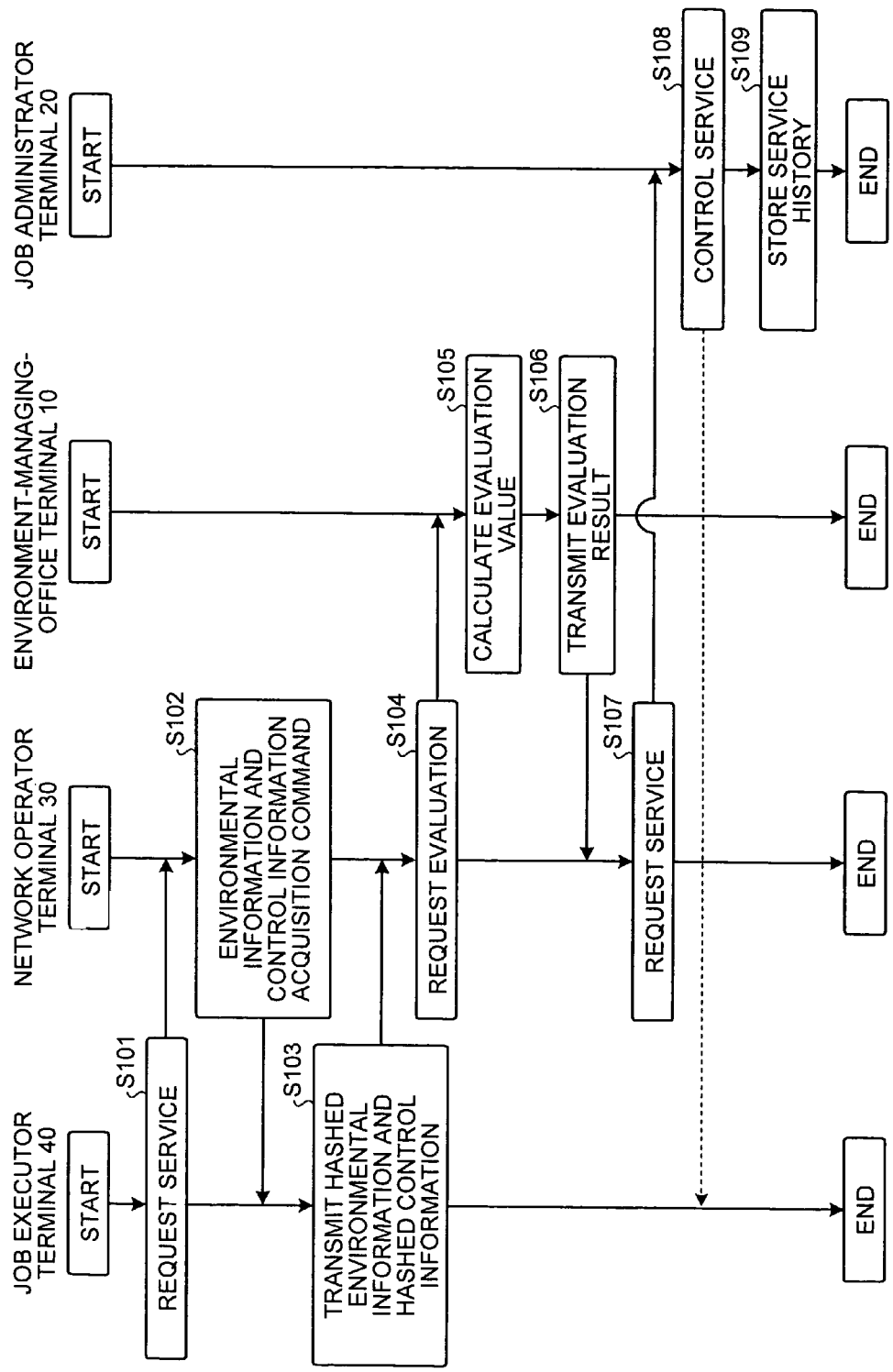
FIG. 17 is a flowchart of processing at the time of service control by the data-use restricting system shown in FIG. 1.

FIG. 17 is a flowchart of processing at the time of service control by the data-use restricting system. In the following explanation, it is assumed that the respective terminals 10 to 40 already have the various kinds of storing means (the databases and the tables) described above. It is assumed that the job administrator terminal 20 transmits service data embedded with control information to the job executor terminal 40.

As shown in FIG. 17, a service request message including a service ID and a job executor ID is transmitted from the job executor terminal 40 to the network operator terminal 30 (step S101). The network operator terminal 30 transmits an environmental-information-acquisition command ID corresponding to the service ID to the job executor terminal 40 and requests the job executor terminal 40 to acquire control information corresponding to the service ID (step S102).

The job executor terminal 40, which has received an environmental information/control information acquisition command, reads out environmental information corresponding to the environmental-information-acquisition command ID and reads out control information corresponding to the service ID from the digital watermark/steganography information DB 45*b*. The job executor terminal 40 hashes the environmental information and the control information read out and transmits the hashed environmental information and the hashed control information to the network operator terminal 30 (step S103).

When the network operator terminal 30 acquires the hashed environmental information and the hashed control information, the network operator terminal 30 transmits an evaluation request including the service ID, the job executor ID, the hashed environmental information, and the hashed control information to the environment-managing-office terminal 10 (step S104). The environment-managing-office terminal 10 calculates an evaluation value by reading out an evaluation value corresponding to the hashed environmental information from the evaluation DB 15*a*, judges, based on an environment of the job executor terminal 40 specified by the hashed control information, the job executor ID, and the hashed environmental information, whether a restriction condition is satisfied, and generates a judgment result (an authentication result) (step S105).

Subsequently, the environment-managing-office terminal 10 transmits an evaluation result including the service ID, the evaluation value, the job executor ID, and the authentication result to the network operator terminal 30 (step S106). The network operator terminal 30, which has acquired the evaluation result, transmits a service request including the service ID, the evaluation value, the job executor ID, and the authentication result to the job administrator terminal 20 (step S107).

The job administrator terminal 20, which has received the service request from the network operator terminal 30, refers to the authentication result and judges whether the job executor terminal 40 satisfies a restriction of the control information. When the job executor terminal 40 does not satisfy the restriction, the job administrator terminal 20 immediately transmits a warning or the like to the job executor terminal 40 and stops the service provision.

On the other hand, when the job executor terminal 40 satisfies the restriction of the control information, the job administrator terminal 20 judges, with reference to the service policy DB 25*a*, whether the evaluation value included in the service request satisfies a service provision condition of the service ID also included in the service request. Then, the job administrator terminal 20 controls a service provided to the job executor terminal 40 (step S108). In other words, the job administrator terminal 20 carries out service control corresponding to the service policy defined in the service policy DB 25*a*. For example, the job administrator terminal 20 reads out contents requested from the job executor DB 25*b* and provides only the job executor terminal 40 satisfying the evaluation value of the service provision condition with the contents.

After execution of the service control, the job administrator terminal 20 registers a service history including the service control date and time, the service ID, the evaluation value used for the service control, and an execution result of the service control in the job service DB 25*c* in association with a job executor ID and a job executor name of a service user who has requested the service (step S109).

As described above, according to the first embodiment, the job administrator terminal 20 embeds, using the digital watermark or the steganography, control information for restricting use of contents in service data such as a computer program required in providing a service and transmits the service data to the job executor terminal 40. When the job executor terminal 40 receives the service data from the job administrator terminal 20, the job executor terminal 40 extracts the control information from the service data and stores the control information extracted in a storing unit. When the job administrator terminal 20 provides the job executor terminal 40 with a service, the job administrator terminal 20 controls provision of the service based on the control information and environmental information of the job executor terminal 40. Thus, it is possible to prevent a service user from illegally using contents of the service against an intension of the service provider.

According to the first embodiment, the job executor terminal 40 stores a history of processing applied to computer programs and image data included in contents and transmits job-execution-history information in response to a request from the environment-managing-office terminal 10. The environment-managing-office terminal 10 judges whether the contents are illegally used, and transmits a result of the judgment to the job administrator terminal 20. Thus, it is possible to prevent the contents from being illegally used after the service provision.

According to the first embodiment, when the job executor terminal 40 acquires service data, the job executor terminal 40 extracts and manages control information embedded in the service data without intervention of a user. Thus, it is possible to solve the problem in that the control information is falsified by a malicious third party.

In the data-use restricting system according to the first embodiment, the environment-managing-office terminal 10 executes calculation and authentication of an evaluation value for the job executor terminal 40. However, another terminal apparatus, for example, the job administrator terminal 20, the network operator terminal 30, or the job executor terminal 40 may execute such processing.

In the first embodiment, a job user ID serving as information on a user is stored in the job-executor-information DB 45c. However, it is possible to record biometric information of the user (information on a finger print or an iris of the user) and uses the biometric information for authentication processing in the environment-managing-office terminal 10.

Moreover, in the first embodiment, hashed environmental information and hashed control information are transmitted from the job executor terminal 40 to the environment-managing-office terminal 10. However, encrypted environmental information and encrypted control information may be transmitted.

In addition to the processing described in the first embodiment, a data-use restricting system according to a second embodiment of the present invention judges, when contents or a computer program included in service data is illegally transmitted to other job executor terminals, which job executor terminal has started the illegal use of the contents or the computer program.

In this way, the data-use restricting system according to the second embodiment can efficiently prevent damage caused by the illegal use of the contents or the computer program by judging a job executor terminal which has started the illegal use of the contents or the computer program. There is also an effect that traceability is assured in that it is possible to specify which job executor terminal has started illegal use. In the second embodiment, terminals and databases identical with those in the first embodiment are denoted by the identical reference numerals and signs. Explanations of the terminals and the databases are omitted.

Figure 18:
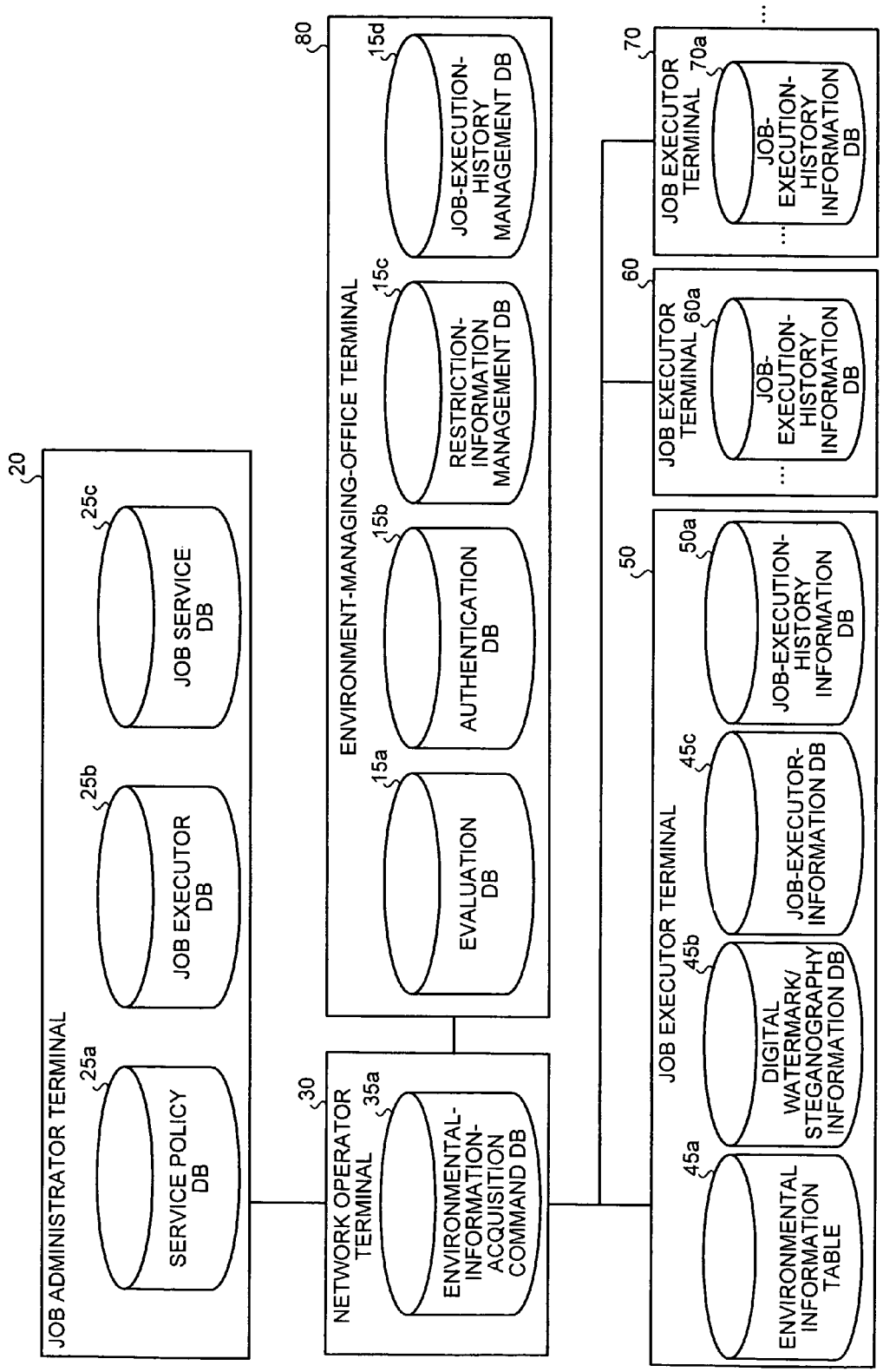
FIG. 18 is a block diagram of a data-use restricting system according to a second embodiment of the present invention.

FIG. 18 is a block diagram of a structure of the data-use restricting system according to the second embodiment. As shown in the figure, the data-use restricting system includes an environment-managing-office terminal 80, the job administrator terminal 20, the network operator terminal 30, and job executor terminals 50 to 70. The terminals 20 to 80 are connected to one another via a network (the Internet, a LAN, a public telephone network, etc.). For convenience of explanation, only the job executor terminals 50 to 70 are shown. However, job executor terminals are not limited to these job executor terminals.

The environment-managing-office terminal 80 is a server computer owned by an environment managing office. As shown in FIG. 18, the environment-managing-office terminal 80 includes the evaluation DB 15a, the authentication DB 15b, a restriction-information management DB 15c, and a job-execution-history management DB 15d. Since the evaluation DB 15a and the authentication DB 15b are the same as those explained with reference to FIGS. 2 and 3, explanations of the databases are omitted.

FIG. 19 is a table of an example of information recorded in the restriction-information management DB 15c. FIG. 20 is a table of an example of information recorded in the job-execution-history management DB 15d. As shown in FIG. 19, the restriction-information management DB 15c stores a restriction information ID, identification information, and restriction information in association with one another. As the restriction information ID, identification information for uniquely identifying the identification information and the restriction information described in the first embodiment is registered. The restriction-information management DB 15c is updated and registered every time new restriction information is generated by a service provider.

As shown in FIG. 20, the job-execution-history management DB 15d records job execution history information (identification information, restriction information, processing contents, a date and time, and a job executor ID) held by the respective job executor terminals 50 to 70). The job-execution-history management DB 15d is updated and registered every time job-execution-history information is acquired from the respective job executor terminals 50 to 70.

The job executor terminals 50 to 70 are known mobile communication terminals such as a personal computer or a workstation, a game machine for home use, an Internet TV, a PDA, or a cellular phone or a PHS used by a service user. The job executor terminal 50 includes the environmental information table 45a, the digital watermark/steganography information DB 45b, the job-executor-information DB 45c, and a job-execution-history information DB 50a. Although the job executor terminals 60 and 70 are not shown in the figure, like the job executor terminal 50, the job executor terminals 60 and 70 include the environmental information table 45a, the digital watermark/steganography information DB 45b, and the job-executor-information DB 45c.

Explanations concerning the environmental information table 45a, the digital watermark/steganography information DB 45b, and the job-executor-information DB 45c are the same as those in the first embodiment. Thus, the explanations are omitted. Since explanations concerning the job-execution-history information DB 50a, a job-execution-history information DB 60a, and a job-execution-history information DB 70a are the same, only the job-execution-history information DB 50a is explained.

The job-execution-history information DB 50a stores therein history information of processing performed by the job executor terminal 50. FIG. 21 is a table of an example of information stored in the job-execution-history information DB 50a according to the second embodiment. As shown in the figure, the job-execution-history information DB 50a stores history information of processing performed by the job executor terminal 50 (hereinafter, "job-execution-history information"). The job-execution-history information DB 50a stores identification information, restriction information, processing contents, and a date and time in association with one another.

Figure 22:
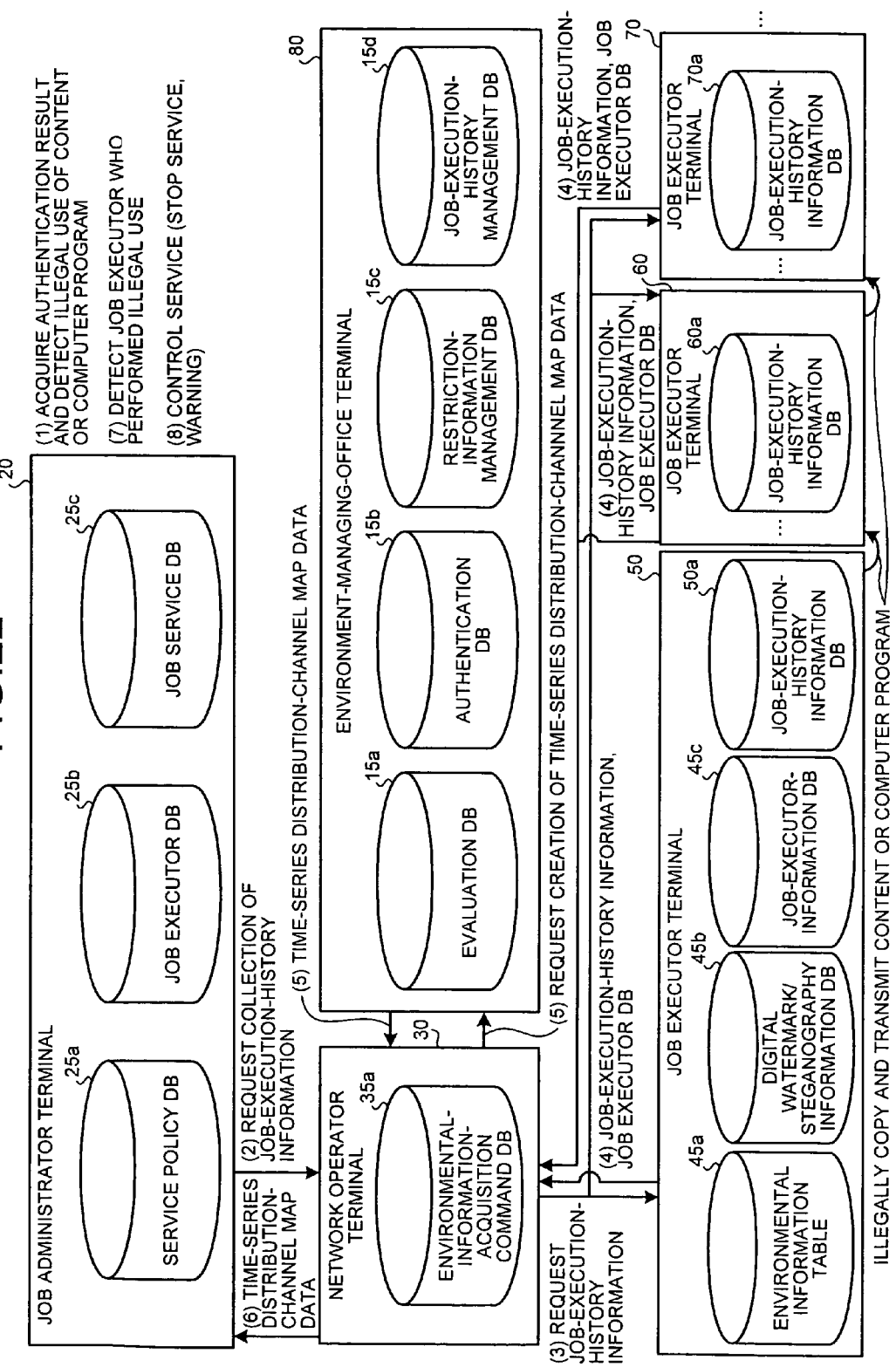
FIG. 22 is a diagram for explaining processing for detecting an illegal job executor terminal in the data-use restricting system shown in FIG. 18.

FIG. 22 is a diagram for explaining processing for detecting an illegal job executor terminal in the data-use restricting system.

As shown in the figure, the job administrator terminal 20 acquires an authentication result from the environment-managing-office terminal 80 and detects illegal use of contents or a computer program (e.g., when the job executor terminal 50 illegally copies contents or a computer program and transmits the contents or the computer program to the job executor terminal 60).

The job administrator terminal 20 sends a collection request for job-execution-history information to the network operator terminal 30. The network operator terminal 30, which has received the collection request for job-execution-history information, requests the job executor terminals 50 to 70 to send job-execution-history information.

The job executor terminals 50 to 70, which have received the request for job-execution-history information, transmit job-execution-history information stored in the job execution history DBs and job executor IDs stored in job-executor-information DBs to the network operator terminal 30.

The network operator terminal 30 transmits the job-execution-history information and the job executor IDs of the respective job executor terminals to the environment-managing-office terminal 80 and requests the environment-managing-office terminal 80 to create time-series distribution-channel map data. The environment-managing-office terminal 80 creates time-series distribution-channel map data.

The time-series distribution-channel map data is a map data in which logs of illegally used data (e.g., a computer program A) first adopted are arrange in time series for each job executor. It is possible to specify, with reference to the time-series distribution-channel map data, which job executor terminal has started illegal use of contents.

Figure 23:
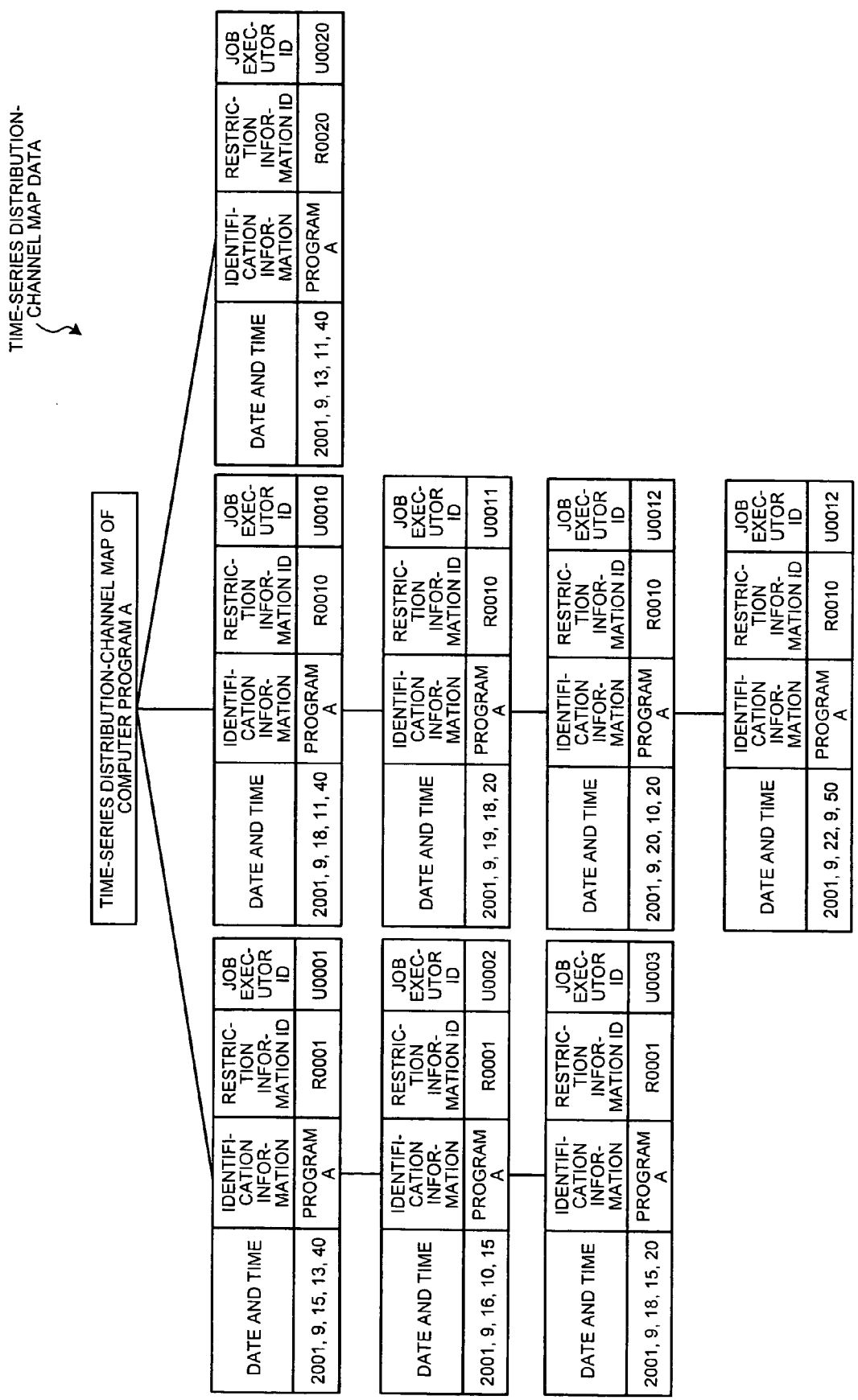
FIG. 23 is a diagram of an example of time-series distribution-channel map data shown in FIG. 22.

FIG. 23 is a diagram of an example of the time-series distribution-channel map data. In FIG. 23, the time-series distribution-channel map data for the computer program A is shown. The time-series distribution-channel map data includes a date and time, identification information, a restriction information ID, and a job executor ID. The time-series distribution-channel map data are classified for each restriction information ID and arranged in order from data with an earliest date and time. Referring to the time-series distribution-channel map data, it is seen that the computer program A restricted by a restriction information ID "R0001" was illegally used by a job executor terminal corresponding to a job executor ID "U0001" first.

It is seen that the computer program A restricted by a restriction information ID "R0010" was illegally used by a job executor terminal corresponding to a job executor ID "U0010" first. Moreover, it is seen that the program A restricted by a restriction information ID "R0020" was illegally used by a job executor terminal corresponding to a job executor ID "U0020" first.

Referring back to FIG. 22, the environment-managing-office terminal 80 transmits the time-series distribution-channel map data created to the network operator terminal 30. The network operator terminal 30 transmits the time-series distribution-channel map data to the job administrator terminal 20.

The job administrator terminal 20 acquires the time-series distribution-channel map data from the network operator terminal 30, detects, based on the time-series distribution-channel map data acquired, a job executor terminal that has performed illegal use of contents or a computer program, and performs service control (stops the service provision or issues a warning).

Figure 24:
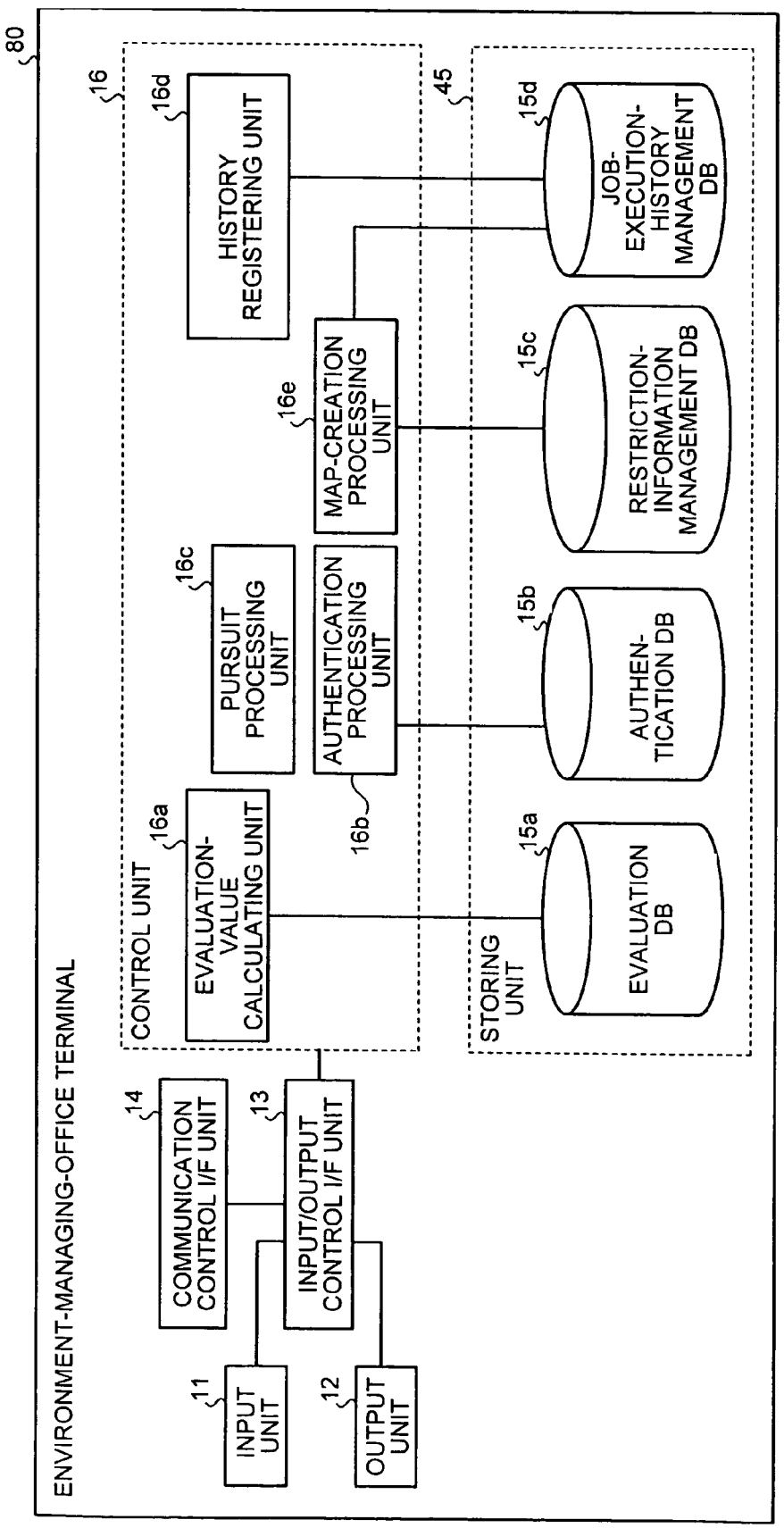
FIG. 24 is a detailed functional block diagram of an environment-managing-office terminal shown in FIG. 18.

FIG. 24 is a detailed functional block diagram of the environment-managing-office terminal 80 according to the second embodiment. As shown in the figure, compared with the environment-managing-office terminal 10 shown in FIG. 13, the environment-managing-office terminal 80 further includes the restriction-information management DB 15c, the job-execution-history management DB 15d, a history registering unit 16d, and a map-creation processing unit 16e.

The history registering unit 16d is a processing unit that acquires job-execution-history information and job executor IDs from the job executor terminals 50 to 70 and registers the job-execution-history information and the job executor IDs acquired in the job-execution-history management DB 15d.

The map-creation processing unit 16e is a processing unit that creates, when a creation request for time-series distribution-channel map data is acquired, time-series distribution-channel map data with reference to the restriction-information management DB 15c and the job-execution-history management DB 15d. The map-creation processing unit 16e compares identification information and restriction information included in the job-execution history information and information recorded in the restriction-information management DB 15c to specify a restriction information ID. The map-creation processing unit 16e classifies the respective pieces of job-execution-history information for each restriction information ID specified and arranges the job-execution-history information in time series to thereby create time-series distribution-channel map data.

Figure 25:
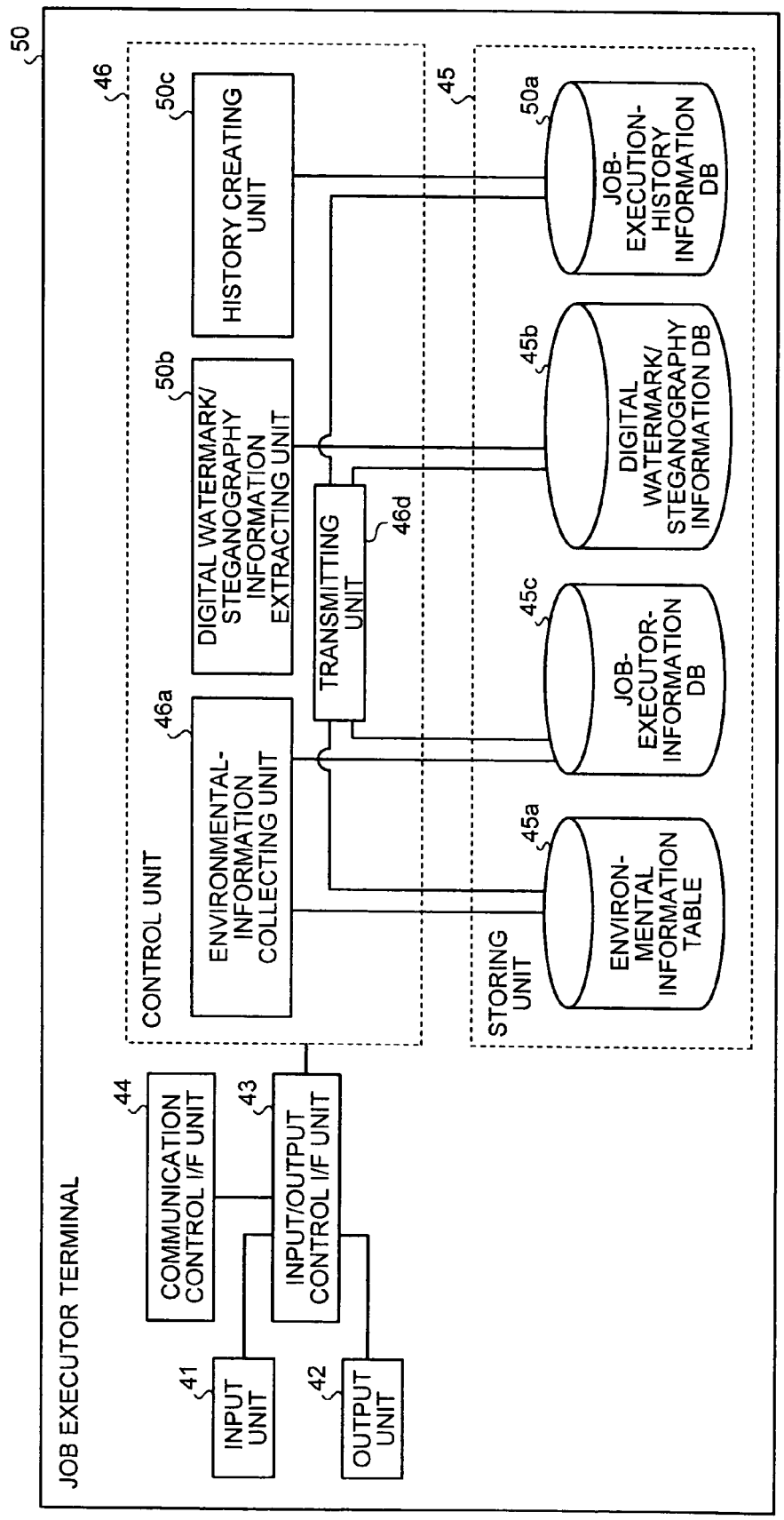
FIG. 25 is a detailed functional block diagram of a job executor terminal shown in FIG. 18.

FIG. 25 is a detailed functional block diagram of the job executor terminal 50 according to the second embodiment. As shown in the figure, the job executor terminal 50 includes the job-execution-history information DB 50a, a digital watermark/steganography information extracting unit 50b, and a history creating unit 50c.

The digital watermark/steganography information extracting unit 50b is a processing unit that extracts control information included in contents acquired from the other job executor terminals and registers the control information extracted in a digital watermark/steganography information DB in addition to the processing performed by the digital watermark/steganography information extracting unit 46b shown in FIG. 16.

The history creating unit 50c is a processing unit that creates a history of processing applied to contents and service data provided from the job administrator terminal 20 and data acquired from the other job executor terminals. Specifically, the history creating unit 50c watches processing of the job executor terminal 50 applied to a computer program and image data included in contents and service data. For example, when the computer program is executed or when the computer program is transmitted to the other terminals, the history creating unit 50c registers information indicating to that effect in the job-execution-history information DB 50a.

The information stored in the job-execution-history information DB 50a is periodically transmitted to the environment-managing-office terminal 80. Since the information stored in the job-execution-history information DB 50a is transmitted to the environment-managing-office terminal 80 in this way, the environment-managing-office terminal 80 is capable of preventing the contents from being used against an intension of the service provider.

In addition to the processing described in the first embodiment, the data-use restricting system according to the second embodiment judges, when contents or a computer program included in service data is illegally transmitted to other job executor terminals, which job executor terminal has started the illegal use of the contents or the computer program. Thus, the data-use restricting system can efficiently prevent damage caused by the illegal use of the contents or the computer program. There is also an effect that traceability is assured in that it is possible to specify which job executor terminal has started illegal use.

In the second embodiment, when the job administrator terminal 20 detects illegal use of contents or a computer program, the job administrator terminal 20 requests the network operator terminal 30 to collect job-execution-history information. However, the job administrator terminal 20 may request the network operator terminal 30 to collect job-execution-history information when the service provider finds a sign of illegal use or at arbitrary timing periodically.

It is possible to realize the respective kinds of processing explained in the embodiments by executing computer programs prepared in advance using a computer. Thus, an example of a computer that executes computer programs for realizing the respective kinds of processing is explained below with reference to FIG. 26.

FIG. 26 is a diagram of a hardware configuration of a computer that constitutes each of the environment-managing-office terminals 10 and 80, the job administrator terminal 20, the network operator terminal 30, the job executor terminals 50 to 70, and the like shown in FIG. 1.

In this computer, an input device 100 that receives input of data from a user, a monitor 101, a random access memory (RAM) 102, a read only memory (ROM) 103, a medium reading device 104 that reads a computer program from a recording medium having various computer programs recorded therein, a network interface 105 that exchanges data with other computers via a network, a central processing unit (CPU) 106, and a hard disk (HD) 107 are connected via a bus 108.

Various programs 107a that show the same functions as the functions of the respective devices described above are stored in the HD 107. When the CPU 106 reads out and executes the programs 107a from the HD 107, various processes 106a for realizing the functions of the functional units of the respective devices described above are started.

Various data 107b corresponding to the data stored in the storing means of the respective devices described above are stored in the HD 107. The CPU 106 stores the various data 107b in the HD 107, reads out the various data 107b from the HD 107 and stores the various data 107b in the RAM 102, and executes data processing based on various data 102a stored in the RAM 102.

The various programs 107a do not always have to be stored in the HD 107 from the beginning. For example, the programs 107a may be stored in a "portable physical medium" such as a flexible disk (FD), a compact disc-read only memory (CD-ROM), a digital versatile disk (DVD), a magneto-optical disk, or an IC card inserted in the computer, a "fixed physical medium" such as a hard disk (HD) provided on the inside or the outside of the computer, or "other computers (or servers)" connected to the computer via a public line, the Internet, a LAN, a wide area network (WAN), or the like. The computer may read out the programs 107a from the medium and execute the programs 107a.

The embodiments of the present invention have been explained. However, the present invention may be carried out in various different embodiments within the scope of the technical idea described in claims other than the embodiments described above.

Among the respective kinds of processing explained in the embodiments, all or a part of the kinds of processing explained as being automatically performed may be manually performed. All or a part of the kinds of processing explained as being manually performed may be automatically performed by a publicly known method.

Besides, the information including the processing procedures, the control procedures, the specific names, and the various data and parameters explained in this specification and shown in the figures may be arbitrarily changed unless specifically noted otherwise.

The respective components of the respective devices shown in the figures are functionally conceptual and are not always required to be physically constituted as shown in the figures. In other words, specific forms of distribution and integration of the components of the respective apparatuses are not limited to those shown in the figures. It is possible to constitute all or a part of the components to be functionally or physically distributed and integrated in an arbitrary unit according to various loads, states of use, and the like.

Moreover, all or an arbitrary part of the various processing functions performed in the respective devices can be realized by a CPU and programs analyzed and executed by the CPU or can be realized as hardware according to the wired logic.

Moreover, the control information included in the service data is automatically extracted using a TCG chip. Thus, it is possible to eliminate the likelihood that an extraction logic of the control information leaks to users and solve the problem in that the control information is written by a malicious service user.

Furthermore, history information of a history of processing applied to the service data by the user terminal is recorded and processing applied to the service data is restricted based on the history information. Thus, it is possible to prevent contents and the like included in a service from being illegally used after the service provider terminal provides the user terminal with the service.

Moreover, management information associating control information of a history of processing applied to the service data by the user terminal, control information concerning the service data, and information on time when the user terminal applies processing to the service data is recorded. Trace information in which a plurality of pieces of management information are aligned in time series is created based on information on time included in the management information. Thus, it is possible to easily specify which user terminal has started illegal use of contents and a computer program.

Furthermore, management information recorded by a plurality of user terminals is acquired and trace information is created based on the pieces of management information acquired. Thus, there is an effect that traceability is assured in that it is possible to specify which job executor terminal has started illegal use.

According to an aspect of the present invention, control information that includes information on environments and users of terminals permitted to use service data and is embedded in the service data is extracted from the service data. Use of the service data is restricted based on the control information extracted and the information on the environment related to the user terminal and the user. Thus, it is possible to prevent illegal use of the service data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method executed by a job administrator terminal that provides service to a job executor terminal and is included in a service provision system, wherein the service provision system further includes an environment-managing-office terminal authenticating the job executor terminal and a network operator terminal relaying communication between the job executor terminal and the environment-managing-office terminal, the method comprising:
   first transmitting service data to the job executor terminal, control information being required for receiving provision of the service and embedded in the service data;
   first receiving an evaluation value computed by the environment-managing-office terminal, an authentication result authenticated by the environment-managing-office terminal, a service ID for uniquely identifying the service and a job executor ID for uniquely identifying the job executor terminal from the network operator terminal, the evaluation value being computed based on hashed control information and hashed environmental information both transmitted from the job executor terminal, the hashed control information being hash value of control information embedded in the service data, the hashed environmental information being hash value of environmental information including information on software and hardware built in the job executor terminal;
   judging whether to transmit a content identified by the service ID based on the evaluation value, the authentication result, the service ID and the job executor ID; and
   controlling the provision of the service to the job executor terminal based on a result of the judging.

2. The method executed by the job administrator terminal according to claim 1, wherein:
the service data includes a program that is required to reproduce the content,
the control information includes information on a job executor who is permitted to execute the content and information on hardware that is admitted to execute the contents.

3. The method executed by the job administrator terminal according to claim 2, wherein:
the first transmitting transmits the service data in which the control information is embedded by using a technique of digital watermark or steganography.

4. The method executed by the job administrator terminal according to claim 2, wherein:
the first receiving receives information, from the environment-managing-office terminal, about the job executor terminal admitted to execute the service illegally using the program via the network operator terminal, and
the controlling transmits a warning to the job executor terminal when the first receiving receives the information about the job executor terminal illegally using the program.

5. The method executed by the job administrator terminal according to claim 2, further comprising:
second transmitting a collection request for job-execution-history information on execution of the program by the job executor terminal to the network operator terminal, and
second receiving a time-series distribution-channel map data from the network operator terminal, the time-series distribution-channel map data is a map data in which logs of illegally used data first adopted are arrange in time series for each job executor, wherein:
the controlling specifies the job executor ID included in the oldest record for using the program in the time-series distribution-channel map data received by the second receiving, and
the controlling transmits a warning to the job executor corresponding to the job executor terminal.

6. A method executed by an environment-managing-office terminal that authenticates a job executor terminal and is included in a service provision system, wherein the service provision system further includes a job administrator terminal providing service to the job executor terminal and a network operator terminal relaying communication between the job executor terminal and the environment-managing-office terminal, the method comprising:
first receiving, from the network operator terminal, hashed control information required for using the service, hashed environmental information including information on software and hardware built in the job executor terminal, a service ID for uniquely identifying the service and a job executor ID for uniquely identifying the job executor terminal;
controlling computing an evaluation value of the job executor terminal based on the hashed control information, the hashed environmental information, the service ID and the job executor ID received by the first receiving, the controlling performs an authentication whether the job executor terminal is permitted to use the service; and
first transmitting the evaluation value and result of the authentication to the network operator terminal.

7. The method executed by the environment-managing-office terminal according to claim 6, further comprising:
acquiring job-execution-history information including a user, content and a date and time for a provision of the service corresponding to the service ID from the job executor terminal via the network operator terminal;
second transmitting, to the job administrator terminal, information about detection when the environment-managing-office terminal detects data that does not satisfy a restriction by comparing the job-execution-history information acquired by the acquiring with the control information concerning the service recorded preliminarily.

8. The method executed by the environment-managing-office terminal according to claim 6, further comprising:
second receiving, from the network operator terminal, the job executor ID and information about a user, a content and a date and time for a provision of the service that represent a job-execution-history of a program included in the service data and stored by the job executor terminal;
creating a time-series distribution-channel map data that is a map data in which logs of the program first adopted are arranged in time series for each job executor terminal by using the job-execution-history received by the second receiving.

9. A method executed by a network operator terminal relaying communication between a job executor terminal and an environment-managing-office terminal and is included in a service provision system, wherein the service provision system further includes a job administrator terminal that provides service to the job executor terminal and the environment-managing-office terminal authenticating the job executor terminal, the method comprising:
first receiving a service ID for uniquely identifying the service and a job executor ID for uniquely identifying the job executor terminal from the job executor terminal;
first transmitting, to the job executor terminal, an environmental-information-acquisition command about the job executor terminal and a request for extracting embedded control information both corresponding to the service ID;
second receiving hashed control information and hashed environmental information both transmitted from the job executor terminal, the hashed control information being hash value of control information embedded in the service data, the hashed environmental information being hash value of environmental information including information on software and hardware built in the job executor terminal;
second transmitting the service ID, the job executor ID, the hashed control information and the hashed environmental information to the environment-managing-office terminal;
third receiving, from the environment-managing-office terminal, an evaluation value computed by the environment-managing-office terminal based on the hashed control information, the hashed environmental information and the job executor ID, the third receiving further receiving a result of an authentication authenticated by the environment-managing-office terminal, the service ID and the job executor ID from the environment-managing-office terminal; and
third transmitting the evaluation value, the result of the authentication, the service ID and the job executor ID to the job administrator terminal.

10. The method executed by the network operator terminal according to claim 9, further comprising:

forth receiving, from the job administrator terminal, a collection request for job-execution-history information on execution of the program included in the service data by the job executor terminal;

forth transmitting a request for the job executor ID and information about a user, a content and a date and time for a provision of the service that represent a job-execution-history of a program included in the control information and stored by the job executor terminal;

fifth receiving the job-execution-history and the job executor ID from the job executor terminal;

fifth transmitting the job-execution-history and the job executor ID received by the fifth receiving to the environment-managing-office terminal;

sixth receiving, from the environment-managing-office terminal, a time-series distribution-channel map data that is a map data in which logs of the program first adopted are arranged in time series for each job executor terminal, the time-series distribution-channel map data is created by using the job-execution-history and the job executor ID transmitted by the fifth transmitting; and sixth transmitting the time-series distribution-channel map data received by the sixth receiving to the job administrator terminal.

11. A non-transitory computer-readable recording medium that stores therein a computer program for controlling a job executor terminal which is included in a service provision system, wherein the service provision system includes a job administrator terminal that provides service to the job executor terminal, an environment-managing-office terminal authenticating the job executor terminal and a network operator terminal relaying communication between the job executor terminal and the environment-managing-office terminal, the computer program causing the job executor terminal to execute:

first receiving, from the job administrator terminal, service data including a program that is required to reproduce the service data, the service data including control information about a user and hardware permitted to use the service data, a service ID corresponding to the service being embedded in the service data;

first transmitting the service ID received by the first receiving and a job executor ID for uniquely identifying the job executor terminal to the network operator terminal;

second receiving, from the network operator terminal, an environmental-information-acquisition command about the job executor terminal and a request for an embedded control information both corresponding to the service ID transmitted by the first transmitting;

second transmitting hashed control information and hashed environmental information to the network operator terminal when the environmental-information-acquisition command or the request for an embedded control information is received by the second receiving, the hashed control information being hash value of control information embedded in the service data, the hashed environmental information being hash value of environmental information including information on software and hardware built in the job executor terminal; and third receiving the service identified by the service ID from the job administrator terminal, the job administrator terminal receiving, from the environment-managing-office terminal, an evaluation value and a result of an authentication both computed by the environment-managing-office terminal based on the hashed control information, the hashed environmental information, the service ID and the job executor ID.

12. The non-transitory computer-readable recording medium according to claim 11, wherein the computer program causes the job executor terminal to further execute;

extracting the control information and the service ID from the service data by using a trusted computing group (TCG) chip.

13. The non-transitory computer-readable recording medium according to claim 11, wherein the computer program causes the job executor terminal to further execute:

recording, in a storing unit, information about a user, a content and a date and time that represent a job-execution-history of a program included in the service data; and third transmitting, to the environment-managing-office terminal, the information recorded by the recording with corresponding job executor ID who executes a job in the job-execution-history.

14. The non-transitory computer-readable recording medium according to claim 11, wherein the computer program causes the job executor terminal to further execute:

recording, in a storing unit, information about a user, a content and a date and time that represent a job-execution-history of a program included in the service data; and third transmitting, to the network operator terminal, the information recorded by the recording with corresponding job executor ID who executes a job in the job-execution-history by request from the network operator terminal.

* * * * *